US008247072B2

(12) United States Patent  
Sumner, Jr. et al.

(10) Patent No.: US 8,247,072 B2  
(45) Date of Patent: Aug. 21, 2012

(54) RESOL BEADS, METHODS OF MAKING THEM AND METHODS OF USING THEM

(75) Inventors: Charles Edwan Sumner, Jr., Kingsport, TN (US); Ramesh Chand Munjal, Kingsport, TN (US); Ruairi Seosamh O'Meadhra, Kingsport, TN (US); Chester Wayne Sink, Kingsport, TN (US); Jerry Steven Fauver, Kingsport, TN (US); Robert Melvin Schisla, Jr., Kingsport, TN (US); Shriram Bagrodia, Kingsport, TN (US); Spencer Erich Hochstetler, Kingsport, TN (US); Tera Jill Hardin, Elizabethton, TN (US)

(73) Assignee: Eastman Chemical Company, Kingsport, TN (US)

( * ) Notice: Subject to any disclaimer, the term of this patent is extended or adjusted under 35 U.S.C. 154(b) by 1213 days.

(21) Appl. No.: 11/594,379

(22) Filed: Nov. 8, 2006

(65) Prior Publication Data

US 2007/0191575 A1 Aug. 16, 2007

Related U.S. Application Data

(63) Continuation-in-part of application No. 11/353,814, filed on Feb. 14, 2006, now abandoned.

(51) Int. Cl.  
*B32B 5/66* (2006.01)

(52) U.S. Cl. ........ 428/402; 428/407; 427/212; 528/129; 528/137; 528/139; 528/140

(58) Field of Classification Search .................. 528/129, 528/137, 139, 140; 427/212; 428/407, 402  
See application file for complete search history.

(56) References Cited

U.S. PATENT DOCUMENTS

| | | | |
|---|---|---|---|
| 3,823,103 A | 7/1974 | Harding | |
| 3,850,868 A | 11/1974 | Wismer et al. | |
| 3,870,670 A | 3/1975 | Hofel et al. | |
| 3,875,089 A | 4/1975 | Hofel et al. | |
| 3,909,449 A | 9/1975 | Nagai et al. | |
| 3,943,080 A | 3/1976 | Wismer et al. | |
| 3,953,345 A | 4/1976 | Saito et al. | |
| 3,960,761 A | 6/1976 | Bürger et al. | |
| 3,962,491 A | 6/1976 | Sato et al. | |
| 4,026,848 A | 5/1977 | Harding et al. | |
| 4,029,600 A | 6/1977 | Schmitt, Jr. et al. | |
| 4,039,525 A | 8/1977 | McCarthy, Jr. | |
| 4,045,368 A | 8/1977 | Katori et al. | |
| 4,051,098 A | 9/1977 | Takemura et al. | |
| 4,071,481 A | 1/1978 | Hanton | |
| 4,182,696 A | 1/1980 | Wynstra et al. | |
| 4,206,095 A * | 6/1980 | Wynstra et al. | 528/137 |
| 4,228,037 A | 10/1980 | Hino et al. | |
| 4,273,675 A | 6/1981 | Shiiki et al. | |
| 4,316,827 A | 2/1982 | Pacala et al. | |
| 4,317,901 A * | 3/1982 | Cosway | 528/139 |
| 4,366,303 A | 12/1982 | Kopf | |
| 4,371,454 A | 2/1983 | Hisatsugu et al. | |
| 4,385,188 A * | 5/1983 | Ferris et al. | 568/493 |
| 4,399,052 A | 8/1983 | Sugino | |
| 4,414,378 A | 11/1983 | Koyama et al. | |
| 4,414,379 A | 11/1983 | Koyama et al. | |
| 4,427,822 A * | 1/1984 | Nishizawa et al. | 524/726 |
| 4,439,349 A | 3/1984 | Everett et al. | |
| 4,454,298 A | 6/1984 | Koyama et al. | |
| 4,466,932 A | 8/1984 | Koyama et al. | |
| 4,476,277 A | 10/1984 | Koyama et al. | |
| 4,542,204 A * | 9/1985 | Shibahara et al. | 528/140 |
| 4,596,845 A | 6/1986 | Koyama et al. | |
| 4,598,110 A | 7/1986 | Koyama et al. | |
| 4,640,971 A | 2/1987 | Echigo et al. | |
| 4,656,239 A | 4/1987 | Waitkus et al. | |
| 4,681,764 A | 7/1987 | Endo et al. | |
| 4,708,967 A * | 11/1987 | Ferentchak et al. | 521/56 |
| 4,748,214 A | 5/1988 | Asami et al. | |
| 4,761,284 A | 8/1988 | Nishimura | |
| 4,778,695 A | 10/1988 | Echigo et al. | |
| 4,822,765 A | 4/1989 | Nishimura | |
| 4,917,835 A | 4/1990 | Lear et al. | |
| 4,933,314 A | 6/1990 | Marumo et al. | |
| 4,975,201 A * | 12/1990 | Ma | 210/686 |
| 5,059,578 A | 10/1991 | Marumo et al. | |
| 5,071,820 A | 12/1991 | Quinn et al. | |
| 5,075,414 A * | 12/1991 | Dailey, Jr. | 528/129 |
| 5,143,889 A | 9/1992 | Takahiro et al. | |
| 5,235,021 A * | 8/1993 | Chum et al. | 528/129 |
| 5,236,688 A | 8/1993 | Watanabe et al. | |
| 5,370,794 A | 12/1994 | Obayashi et al. | |
| 5,380,526 A | 1/1995 | Ise | |
| 5,380,594 A | 1/1995 | Von Blücher et al. | |
| 5,399,551 A | 3/1995 | Ise et al. | |
| 5,451,444 A | 9/1995 | DeLiso et al. | |
| 5,456,868 A | 10/1995 | Lear et al. | |
| 5,554,370 A | 9/1996 | Uehara et al. | |
| 5,556,622 A | 9/1996 | Uehara et al. | |
| 5,562,901 A | 10/1996 | Uehara et al. | |
| 5,573,761 A | 11/1996 | Ise et al. | |
| 5,677,373 A | 10/1997 | Berge et al. | |
| 5,686,081 A | 11/1997 | Ono et al. | |
| 5,739,265 A | 4/1998 | Rahman et al. | |

(Continued)

FOREIGN PATENT DOCUMENTS

CN 1188074 7/1998

(Continued)

OTHER PUBLICATIONS

Majewicz, Thomas G. et al.; "Cellulose Ethers"; Encyclopedia of Polymer Science and Technology; vol. 5; pp. 507-532; 2002; John Wiley and Sons.

(Continued)

*Primary Examiner* — Leszek Kiliman  
(74) *Attorney, Agent, or Firm* — Michael Carrier

(57) ABSTRACT

Resol beads are disclosed that are prepared in high yield by reaction of a phenol with an aldehyde, with a base as catalyst, a colloidal stabilizer, and optionally a surfactant. The resol beads have a variety of uses, and may be thermally treated and carbonized to obtain activated carbon beads.

40 Claims, No Drawings

U.S. PATENT DOCUMENTS

| | | | |
|---|---|---|---|
| 5,763,559 A * | 6/1998 | Black | 528/146 |
| 5,817,046 A | 10/1998 | Glickman | |
| 5,880,061 A | 3/1999 | Yoshino et al. | |
| 5,919,163 A | 7/1999 | Glickman | |
| 6,024,899 A | 2/2000 | Peng et al. | |
| 6,064,560 A | 5/2000 | Hirahara et al. | |
| 6,090,362 A | 7/2000 | Gadkaree | |
| 6,186,146 B1 | 2/2001 | Glickman | |
| 6,224,003 B1 * | 5/2001 | Clough | 241/16 |
| 6,309,446 B1 | 10/2001 | Nakanoya et al. | |
| 6,316,378 B1 | 11/2001 | Giebelhausen et al. | |
| 6,376,404 B1 | 4/2002 | Giebelhausen et al. | |
| 6,387,385 B1 * | 5/2002 | Wang | 424/408 |
| 6,551,700 B2 | 4/2003 | Giebelhausen et al. | |
| 6,558,667 B2 | 5/2003 | Nakanishi | |
| 6,608,162 B1 | 8/2003 | Chiu et al. | |
| 6,631,073 B1 | 10/2003 | Sakata et al. | |
| 6,737,445 B2 | 5/2004 | Bell et al. | |
| 6,761,174 B2 | 7/2004 | Jupe et al. | |
| 6,787,029 B2 | 9/2004 | Gaudet et al. | |
| 6,789,547 B1 | 9/2004 | Paine, III | |
| 6,830,753 B2 | 12/2004 | Sonobe et al. | |
| 6,848,450 B2 | 2/2005 | Lilly, Jr. et al. | |
| 7,160,366 B2 | 1/2007 | Blackburn et al. | |
| 2003/0003289 A1 | 1/2003 | Py et al. | |
| 2003/0075193 A1 | 4/2003 | Li et al. | |
| 2003/0092560 A1 | 5/2003 | Von Blucher et al. | |
| 2003/0096937 A1 | 5/2003 | Ingram et al. | |
| 2003/0118581 A1 | 6/2003 | Sonobe et al. | |
| 2003/0153458 A1 | 8/2003 | Trnetschek et al. | |
| 2003/0154993 A1 | 8/2003 | Paine, III et al. | |
| 2004/0006192 A1 | 1/2004 | Aiba et al. | |
| 2004/0024074 A1 | 2/2004 | Tennison et al. | |
| 2004/0141963 A1 | 7/2004 | Umekawa et al. | |
| 2004/0194792 A1 | 10/2004 | Zhuang et al. | |
| 2004/0226569 A1 | 11/2004 | Yang et al. | |
| 2004/0235656 A1 | 11/2004 | Gaudet et al. | |
| 2005/0019574 A1 * | 1/2005 | McCrary | 428/403 |
| 2005/0022833 A1 | 2/2005 | Gedevanishvili et al. | |
| 2005/0109356 A1 | 5/2005 | Reddy et al. | |
| 2005/0133051 A1 | 6/2005 | Luan et al. | |
| 2005/0166935 A1 | 8/2005 | Reddy et al. | |

FOREIGN PATENT DOCUMENTS

| | | |
|---|---|---|
| CN | 1240220 A | 1/2000 |
| CN | 1247212 | 3/2000 |
| CN | 1279125 | 1/2001 |
| EP | 0 000 090 A1 | 12/1978 |
| EP | 0 115 130 A1 | 8/1984 |
| EP | 1 064 996 A1 | 1/2001 |
| EP | 1 134 023 A1 | 9/2001 |
| EP | 1 249 241 A1 | 10/2002 |
| GB | 1 347 878 | 2/1974 |
| GB | 1 383 085 | 2/1975 |
| GB | 1 457 013 | 12/1976 |
| GB | 1 457 014 | 12/1976 |
| GB | 2 012 257 A | 7/1979 |
| GB | 2 053 176 A | 2/1981 |
| JP | 51013491 B | 10/1974 |
| JP | 63-48320 A | 3/1988 |
| JP | 2549365 B2 | 3/1988 |
| JP | 1-158969 A | 6/1989 |
| JP | 1993 031360 A | 2/1993 |
| JP | 1994 106056 A | 4/1994 |
| JP | 1994 199689 A | 7/1994 |
| JP | 1994 298653 A | 10/1994 |
| JP | 1996 040918 A | 2/1996 |
| JP | 1996 040919 A | 2/1996 |
| JP | 1996 208491 A | 8/1996 |
| JP | 1998 273443 A | 10/1998 |
| JP | 10-338511 A | 12/1998 |
| JP | 1998 316578 A | 12/1998 |
| JP | 1999 029485 A | 2/1999 |
| JP | 11116217 | 4/1999 |
| JP | 11116648 | 4/1999 |
| JP | 1999 292770 A | 10/1999 |
| JP | 2000 053737 | 2/2000 |
| JP | 2000 239335 | 9/2000 |
| JP | 2000 239336 | 9/2000 |
| WO | WO 02/12380 A2 | 2/2002 |
| WO | WO 03/059096 A1 | 7/2003 |
| WO | WO 03/072242 A2 | 9/2003 |
| WO | WO 2004/005419 A1 | 1/2004 |
| WO | WO2004005419 * | 1/2004 |
| WO | WO 2004/047571 A2 | 6/2004 |
| WO | WO 2004/080217 A1 | 9/2004 |
| WO | WO 2005/016819 A1 | 2/2005 |
| WO | WO 2005/039333 A1 | 5/2005 |
| WO | WO 2005/075379 A2 | 8/2005 |

OTHER PUBLICATIONS

Office Action date of mailing Jan. 2, 2008 from co-pending U.S. Appl. No. 11/594,621.
Baker et al.; "Carbon (Activated)"; Kirk-Othmer Encyclopedia of Chemical Technology; vol. 4, pp. 1015-1037.
Kopf et al; "Phenolic Resins"; Kirk-Othmer Encyclopedia of Chemical Technology; vol. 18, pp. 603-644.
Camsizer Particle analysis with digital image processing article distributed in North America by Horiba Instruments, Inc. 1761 Armstrong Avenue; Irvine, CA 92614.
Yang J-B et al.; "Preparation and properties of phenolic resin-based activated carbon spheres with controlled pore size distribution"; CARBON, vol. 40; No. 6; May 2002; pp. 911-916.
Yang et al.; "Study on the Activation Characterization of Phenolic Resin—Based Spherical Carbon"; New Carbon Materials, China, vol. 14, No. 4, 1999.
Yang et al; "Preparation and Properties of Phenolic Resin-Based Spherical Activated Carbon by Adding PEC"; Activated Carbon Symposium (2002) p. 676-677.
Co-pending U.S. Appl. No. 11/594,378, filed Nov. 8, 2006; Sumner et al.
Co-pending U.S. Appl. No. 11/594,409, filed Nov. 8, 2006; Sink et al.
Co-pending U.S. Appl. No. 11/594,303, filed Nov. 8, 2006; Tustin et al.
Co-pending U.S. Appl. No. 11/594,621, filed Nov. 8, 2006; Sink et al.
Notification of Transmittal of the International Search Report and the Written Opinion of the International Searching Authority, or the Declaration date of mailing Jul. 23, 2007 on PCT/US2007/003206.
Notification of Transmittal of the International Search Report and the Written Opinion of the International Searching Authority, or the Declaration date of mailing Aug. 2, 2007 on PCT/US2007/003204.
Notification of Transmittal of the International Search Report and the Written Opinion of the International Searching Authority, or the Declaration date of mailing Aug. 29, 2007 on PCT/US2007/003226.
Co-pending U.S. Appl. No. 11/847,711, filed Aug. 30, 2007; Sumner et al.
Webb, P.A. et al.; "Methods in Fine Particle Technology", Micromeritics Corp, 1997, p. 73.

* cited by examiner

RESOL BEADS, METHODS OF MAKING THEM AND METHODS OF USING THEM

CROSS-REFERENCE TO RELATED APPLICATION

This application is a continuation-in-part of U.S. patent application Ser. No. 11/353,814, filed on Feb. 14, 2006 now abandoned, the disclosure of which is incorporated herein by reference in its entirety.

FIELD OF THE INVENTION

The present invention relates to phenolic resins, and more specifically, to resol beads and to methods of making and using them.

BACKGROUND OF THE INVENTION

Phenol-formaldehyde resins are polymers prepared by reacting a phenol with an aldehyde in the presence of an acid or a base, the base-catalyzed phenolic resins being classified as resol-type phenolic resins. A typical resol is made by reacting phenol with an excess of formaldehyde, in the presence of a base such as ammonia, to produce a mixture of methylol phenols which condense on heating to yield low-molecular weight prepolymers, or resols. On heating of the resols at elevated temperature under basic, neutral, or slightly acidic conditions, a high molecular weight network structure of phenolic rings is produced, linked by methylene groups, and typically retaining residual methylol groups.

GB 1,347,878 discloses a process in which phenol or a phenol derivative is condensed with formaldehyde in aqueous solution, in the presence of a catalyst which is an organic or an inorganic base, and in a homogeneous phase, to obtain a resin in the form of a suspension of oily droplets in the reaction medium, the suspension being stabilized by the addition of a dispersing agent which prevents the coalescence of the droplets. The process described results in spherical beads of phenolic resin that may be separated, washed, and dried, that are said to be useful for a variety of purposes, for example as filling material or for lightening the weight of such traditional materials as cement or plaster.

GB 1,457,013 discloses cellular, spherical beads having a high carbon content, containing a plurality of closed cells, wherein the walls of the peripheral cells form a continuous skin marking the limits of the external surface. The beads may be comprised of an organic precursor material, which can be a phenoplast, and the process by which they are made includes a carbonization step.

U.S. Pat. No. 3,850,868 discloses reacting urea or phenol and formaldehyde in a basic aqueous medium to provide a prepolymer solution, blending the prepolymer in the presence of a protective colloid-forming material, subsequently acidifying the basic pre-polymer solution so that particles are formed and precipitated in the presence of a colloid-forming material, as spheroidal beads, and finally collecting and, if desired, drying the urea or phenol formaldehyde particulate beads. The resulting beads are said to have a high flatting efficiency making them suitable for low gloss coating compositions.

U.S. Pat. No. 4,026,848 discloses aqueous resole dispersions produced in the presence of gum ghatti and a thickening agent. The dispersions are said to have enhanced utility in such end-use applications as coatings and adhesives.

U.S. Pat. No. 4,039,525 discloses aqueous resol dispersions produced in the presence of certain hydroxyalkylated gums, such as hydroxyalkylated guar gums, as interfacial agents.

U.S. Pat. No. 4,206,095 discloses particulate resols produced by reacting a phenol, formaldehyde, and an amine in an aqueous medium containing a protective colloid, to produce an aqueous suspension of a particulate resol, and recovering the particulate resol from the suspension.

U.S. Pat. No. 4,316,827 discloses resin compositions useful as friction particles that include a mixture of tri- and/or tetrafunctional and difunctional phenols, an aldehyde, an optional reaction-promoting compound, a protective colloid, and a rubber. In a first step condensation reaction, the rubber can be incorporated either in the interior or incorporated on the surface of the resin particles. The condensation product is subjected to a second step under acidic conditions, which results in a product in particulate form that is said to require no grinding or sieving when used as a friction particle.

U.S. Pat. No. 4,366,303 discloses a process for producing particulate resol resins that comprises reacting formaldehyde, phenol and an effective amount of hexamethylenetetramine or a compound containing amino hydrogen, or mixtures thereof, in an aqueous medium containing an effective amount of a protective colloid for a sufficient time to produce a dispersion of a particulate resol resin; cooling the reaction mixture to below about 40° C.; reacting the cooled reaction mixture with an alkaline compound to form alkaline diphenates; and recovering from the aqueous dispersion a resin exhibiting increased cure rates and increased sinter resistance.

U.S. Pat. No. 4,182,696 discloses solid particulate, heat-reactive, filler-containing molding compositions that are directly produced by reacting a phenol, formaldehyde, and an amine in an aqueous medium containing a water-insoluble filler material having reactive sites on the surface thereof that chemically bond with a phenolic resin and protective colloid to produce an aqueous suspension of a particulate filler-containing resol, and recovering the filler-containing resole from the suspension. The filler materials may be in the form of fibrous or non-fibrous particles and may be inorganic or organic.

U.S. Pat. Nos. 4,640,971 and 4,778,695 disclose a process for producing a resol resin in the form of microspherical particles of a size not exceeding 500 μm by polymerizing phenols and aldehydes in the presence of a basic catalyst and a substantially water-insoluble inorganic salt. Preferred inorganic salts, which include calcium fluoride, magnesium fluoride, and strontium fluoride, partially or entirely cover the surface of the resulting microspherical particles.

U.S. Pat. No. 4,748,214 discloses a process for producing microspherical cured phenolic resin particles having a particle diameter of not more than about 100 μm by reacting a novolak resin, a phenol, and an aldehyde in an aqueous medium in the presence of a basic catalyst and an emulsion stabilizer. The novalak resin employed in the process is obtained by heating a phenol and an aldehyde in the presence of an acidic catalyst such as hydrochloric acid or oxalic acid to effect polymerization, dehydrating the polymerization product under reduced pressure, cooling the product, and coarsely pulverizing it.

U.S. Pat. No. 4,071,481 discloses phenolic foams, mixtures for producing them, and their processes of manufacture. The resin used is a base catalyzed polycondensation product of phenol and formaldehyde which is obtained in a solid, reactive, fusible, substantially anhydrous state. The resin is foamed and hardened by the application of heat without the use of a catalyst. Heat sensitive blowing agents, either in liquid form or in particulate form may be mixed with the resin prior to heating. Surfactants and lubricants may be utilized to enhance the uniformity of the voids in the foam. The resulting foams are said to be non-acidic, resistant to color changes, and substantially anhydrous.

U.S. Pat. No. 5,677,373 discloses a process for producing a dispersion, wherein dispersed slightly crosslinked polyvinyl seed particles are swollen with an ionizing liquid, the seed particles containing covalently linked ionizable groups causing a swelling of the seed particles by the ionizing liquid to form a dispersion of droplets, wherein the resulting droplets after the swelling have a volume which is at least five times that of the seed particles. The ionizing liquid may be or contain a polymerizable monomer or may be charged with such a monomer. Polymerization of the monomers is said to be effected in the droplets during or after the swelling, to form polymer particles.

Chinese Pat. Discl. No. CN 1240220A discloses a method for manufacturing a phenol-formaldehyde resin-based spherical activated carbon that includes mixing together a linear phenol-formaldehyde resin and a curing agent to form a block mixture, crushing the block mixture to form particles of a resin raw material, dispersing the resin raw material in a dispersion liquid that contains a dispersing agent, emulsifying the material to form spheres, and carbonizing and activating the resulting spheres JP 6348320 A discloses a method for manufacturing a particulate phenolic resin, in which a particulate obtained from a condensation product aggregating around a core substance is produced by subjecting a phenol and an aldehyde to a condensation reaction in the presence of a dispersant and the core substance. The particulate is then dehydrated and dried. The core substance can be either an organic or an inorganic material. The particulate material obtained is characterized as being relatively soluble in acetone.

Japanese Pat. Publn. No. JP 10-338511A discloses a spherical phenolic resin having a particle diameter from 150 to 2,500 µm obtained by condensing phenols and aldehydes in the presence of a dispersant with a nucleus material, by causing the condensation product to aggregate around the nucleus material. A phenolic resin, glass granules, SiC, mesophase carbon, alumina, graphic, and phlogopite, are said to be useful as nucleus material.

Spherical beads comprised of phenolic polymers may thus be made using various methods and have a variety of uses and, while for many uses the particle size and particle size distribution may not be especially important, for some uses, particle size may well be an important factor, for example, when a carbonized product is desired having particular transport or adsorption properties. It may also be important to obtain particles having a relatively narrow particle size distribution, for example when the bulk flow properties of a carbonized product are important, such as to facilitate flow of the particles, or when predictable packing of the particles is necessary or helpful.

For example, U.S. Pat. Publ. No. 2003/0154993 A1, which discloses cigarettes that include a tobacco rod and a filter component having a cavity filled with spherical beaded carbon, emphasizes the importance of obtaining point-to-point contact between the spherical beads together with substantially complete filling of the cavity so as to produce minimal channeling of ambulatory gas phase as well as maximum contact between the gas phase and the carbon surface of the spherical beads during smoking.

For these and other uses, obtaining a desired particle size and shape and particle size distribution may be an important factor in the economic viability of a spherical polymer bead in the marketplace. There remains a need in the art for resol beads useful in a variety of products, that overcome the various disadvantages of those presently known in the art.

SUMMARY OF THE INVENTION

In one aspect, the invention relates to processes for producing resol beads, the processes comprising reacting a phenol with an aldehyde, in the presence of a base as catalyst, in an agitated aqueous medium provided with a colloidal stabilizer, optionally a surfactant, and previously-formed resol beads, for a period of time and at a temperature sufficient to produce an aqueous dispersion of resol beads. The previously-formed resol beads may vary within a wide range of particle sizes and particle size distributions, as disclosed and claimed herein. In this aspect, the process may further include recovering from the aqueous dispersion resol beads above a minimum particle size, and retaining or recycling resol beads below the minimum particle size in or to the aqueous dispersion.

In another aspect, the invention relates to processes for producing resol beads, the processes including reacting a phenol with an aldehyde, in the presence of a base as catalyst, in an agitated aqueous medium provided with a colloidal stabilizer, and optionally a surfactant, for a period of time and at a temperature sufficient to produce an aqueous dispersion of resol beads; recovering from the aqueous dispersion resol beads above a minimum particle size; and retaining or recycling resol beads below the minimum particle size in the aqueous dispersion.

In yet another aspect, the invention relates to processes for producing resol beads, the processes including the steps of: a) reacting a phenol with an aldehyde in the presence of a base as catalyst, in an agitated aqueous medium that includes a colloidal stabilizer, and optionally a surfactant, for a period of time and at a temperature sufficient to produce an aqueous dispersion of resol beads; b) recovering the resol beads from the aqueous dispersion; c) separating beads below a minimum particle size; and d) recycling the beads below a minimum particle size to the aqueous medium of step a).

In a further aspect, the invention relates to processes for producing resol beads, the processes comprising: providing a phenol, a portion of an aldehyde, and a portion of a base as catalyst to a reaction mixture which is an agitated aqueous medium provided with a colloidal stabilizer, optionally a surfactant, and previously-formed resol beads; reacting in the reaction mixture for a period of time and at a temperature sufficient to produce an aqueous dispersion of partially-formed resol beads; thereafter adding a remaining portion of the base and the aldehyde over a period of time and further reacting the reaction mixture to obtain fully-formed resol beads.

Another aspect of the invention relates to processes for producing resol beads, the processes comprising: providing a portion of a phenol, a portion of an aldehyde, and a portion of a base as catalyst to a reaction mixture which is an agitated aqueous medium that includes a colloidal stabilizer, optionally a surfactant, and previously-formed resol beads; reacting for a period of time and at a temperature sufficient to produce an aqueous dispersion of partially-formed resol beads; thereafter providing a further portion of the phenol, a further portion of the aldehyde, and a further portion of the base to the reaction mixture and reacting for a further period of time; and thereafter adding any remaining portion of the phenol, the aldehyde, and the base over a period of time and at a temperature sufficient to obtain fully-formed resol beads.

In yet another aspect, the invention relates to resol beads made by processes comprising reacting a phenol with an aldehyde, in the presence of a base as catalyst, in an agitated aqueous medium provided with a colloidal stabilizer, optionally a surfactant, and previously-formed resol beads, for a period of time and at a temperature sufficient to produce an aqueous dispersion of resol beads.

In yet another aspect, the invention relates to resol beads made by processes comprising: reacting a phenol with an aldehyde, in the presence of a base as catalyst, in an agitated aqueous medium provided with a colloidal stabilizer, and optionally a surfactant, for a period of time and at a temperature sufficient to produce an aqueous dispersion of resol beads; recovering from the aqueous dispersion resol beads above a minimum particle size; and retaining or recycling resol beads below the minimum particle size in the aqueous dispersion.

A further aspect of the invention relates to resol beads made by processes comprising: a) reacting a phenol with an aldehyde in the presence of a base as catalyst, in an agitated aqueous medium that includes a colloidal stabilizer, and optionally a surfactant, for a period of time and at a temperature sufficient to produce an aqueous dispersion of resol beads; b) recovering the resol beads from the aqueous dispersion; c) separating beads below a minimum particle size; and d) recycling the beads below a minimum particle size to the aqueous medium of step a).

In yet another aspect, the invention relates to resol beads made by processes comprising: providing a phenol, a portion of an aldehyde, and a portion of a base as catalyst to a reaction mixture which is an agitated aqueous medium provided with a colloidal stabilizer, optionally a surfactant, and previously-formed resol beads; reacting in the reaction mixture for a period of time and at a temperature sufficient to produce an aqueous dispersion of partially-formed resol beads; thereafter adding a remaining portion of the base and the aldehyde over a period of time and further reacting the reaction mixture to obtain fully-formed resol beads.

A further aspect of the invention relates to resol beads made by processes comprising: providing a portion of a phenol, a portion of an aldehyde, and a portion of a base as catalyst to a reaction mixture which is an agitated aqueous medium that includes a colloidal stabilizer, optionally a surfactant, and previously-formed resol beads; reacting for a period of time and at a temperature sufficient to produce an aqueous dispersion of partially-formed resol beads; thereafter providing a further portion of the phenol, a further portion of the aldehyde, and a further portion of the base to the reaction mixture and reacting for a further period of time; and thereafter adding any remaining portion of the phenol, the aldehyde, and the base over a period of time and at a temperature sufficient to obtain fully-formed resol beads.

Further aspects of the invention are as disclosed or claimed below.

DETAILED DESCRIPTION OF THE INVENTION

The present invention may be understood more readily by reference to the following detailed description of the invention, and to the examples provided. It is to be understood that this invention is not limited to the specific processes and conditions described, because specific processes and process conditions for processing articles according to the invention may vary. It is also to be understood that the terminology used is for the purpose of describing particular embodiments only and is not intended to be limiting.

As used in the specification and the claims, the singular forms "a," "an," and "the" include plural referents unless the context clearly dictates otherwise.

By "comprising" or "containing" we mean that at least the named compound, element, particle, etc. must be present in the composition or article, but does not exclude the presence of other compounds, materials, particles, etc., even if the other such compounds, material, particles, etc. have the same function as what is named.

In one aspect, the invention relates to resol beads that comprise the reaction product of a phenol with an aldehyde, reacted in a basic agitated aqueous medium containing previously-formed resol beads, a colloidal stabilizer, and optionally a surfactant. The previously-formed resol beads, also referred to herein as previously-formed beads and as seed particles, assist in obtaining a desired particle size and particle size distribution. The processes according to the invention may be carried out batch-wise, in semi-batch fashion, or continuously, as further described below.

In a typical batch process, the resol beads may be prepared, for example, by combining in an agitated aqueous medium a phenol and an aldehyde, in the presence of previously-formed resol beads, a base such as ammonium hydroxide as catalyst, a colloidal stabilizer such as carboxymethylcellulose sodium, and optionally a surfactant such as sodium dodecylsulfate, and reacting them together at a temperature and time sufficient to obtain the desired product. In semi-batch processes, one or more of the foregoing may be added to the reaction mixture during the course of the reaction.

In one aspect, the invention thus relates to resol beads having a desired particle size and particle size distribution, the resol beads comprising the reaction product of a phenol and an aldehyde, reacted in the presence of a base as catalyst, for example in a basic, agitated aqueous medium that includes a colloidal stabilizer, and optionally a surfactant.

In yet another aspect, the invention relates to processes for producing resol beads, the processes including a step of reacting a phenol with an aldehyde, in the presence of a base as catalyst, in an agitated aqueous medium that includes a colloidal stabilizer, and optionally a surfactant, in the presence of previously-formed resol beads, for a period of time and at a temperature sufficient to produce an aqueous dispersion of resol beads. The previously-formed resol beads may be obtained, for example, as under-sized resol beads produced in a previous batch, or in the case of a continuous or semi-continuous process, as recycled beads obtained at any earlier point in the process.

In yet another aspect, the invention relates to processes for producing resol beads, the processes including:

a) reacting a phenol with an aldehyde in the presence of a base as catalyst, in an agitated aqueous medium that includes a colloidal stabilizer, and optionally a surfactant, for a period of time and at a temperature sufficient to produce an aqueous dispersion of resol beads;

b) recovering the water-insoluble resol beads from the aqueous dispersion;

c) separating beads below a minimum particle size; and d) recycling the beads below a minimum particle size to the aqueous medium of step a).

In yet another aspect, the invention relates to processes for producing resol beads, the processes including:

a) reacting a phenol with an aldehyde in the presence of a base as catalyst, in an agitated aqueous medium that includes a colloidal stabilizer, and optionally a surfactant, for a period of time and at a temperature sufficient to produce an aqueous dispersion of resol beads;

b) recovering water-insoluble resol beads above a minimum particle size from the aqueous dispersion; and c) retaining or recycling beads below the minimum particle size in the aqueous dispersion of resol beads.

In yet another aspect, the invention relates to processes for producing resol beads, the processes including:

a) reacting a phenol with an aldehyde in the presence of a base as catalyst, in an agitated aqueous medium that includes a colloidal stabilizer, and optionally a surfactant, for a period of time and at a temperature sufficient to produce an aqueous dispersion of resol beads;

b) recovering water-insoluble resol beads above a minimum particle size from the aqueous dispersion; and c) retaining or recycling beads within a desired particle size range in or to the aqueous dispersion of resol beads.

The resol beads of the invention may have a variety of particle sizes and particle size distributions. The beads may be cured or partially cured, and afterward used or further processed, such as by carbonization and activation, to obtain, for example, activated carbon beads.

In the processes according to the invention, the reactants may be combined in a batch process, or one or more of the reactants or catalysts may be added over time, alone or together, in semi-batch mode. Further, the processes according to the invention may be carried out continuously or semi-continuously, in a variety of reaction vessels and with a variety of agitation means, as further described herein.

Thus, in one aspect, the invention relates to processes for producing resol beads, the processes including a step of providing a phenol, at least a portion of an aldehyde, and at least a portion of a base as catalyst to a reaction mixture which is an agitated aqueous medium that includes a colloidal stabilizer, optionally a surfactant, and previously-formed resol beads; reacting for a period of time and at a temperature sufficient to produce an aqueous dispersion of resol beads; and thereafter adding any remaining portion of the base and the aldehyde over a period of time, such as about 45 minutes. The previously-formed resol beads may be obtained, for example, as under-sized resol beads produced in a previous batch, or in the case of a continuous or semi-continuous process, as recycled beads obtained at any earlier point in the process.

In yet another aspect, the invention relates to processes for producing resol beads, the processes including a step of providing at least a portion of a phenol, at least a portion of an aldehyde, and at least a portion of a base as catalyst to a reaction mixture which is an agitated aqueous medium that includes a colloidal stabilizer, optionally a surfactant, and previously-formed resol beads; reacting for a period of time and at a temperature sufficient to produce an aqueous dispersion of resol beads, for example up to about two hours; thereafter a further portion of the phenol, a further portion of the aldehyde, and a further portion of a base as catalyst are added to the reaction mixture and reacted, for example for an additional two hours; and thereafter adding any remaining portion of the phenol, the aldehyde, and the base over a period of time and at a temperature sufficient to obtain the desired resol beads. The previously-formed resol beads may be obtained, for example, as under-sized resol beads produced in a previous batch, or in the case of a continuous or semi-continuous process, as recycled beads obtained at any earlier point in the process.

In yet another aspect, the processes of the invention may be carried out as already described, with a further portion of a base added after the reactants have begun reacting, or even when the reaction is otherwise substantially completed, the base being the same as or different from that already added to the reaction mixture as a catalyst for the reaction. Alternatively, a portion of acid may be added after the reaction is begun or is substantially completed, or the processes described may be followed by a period of curing at an elevated temperature.

In one aspect, the invention relates to processes for producing resol beads, the processes including:

a) reacting a phenol with an aldehyde in the presence of a base as catalyst, in an agitated aqueous medium that includes a colloidal stabilizer, and optionally a surfactant, for a period of time and at a temperature sufficient to produce an aqueous dispersion of resol beads;

b) recovering the water-insoluble resol beads from the aqueous dispersion;

c) separating beads below a minimum particle size; and d) recycling the beads below a minimum particle size to the aqueous medium of step a), wherein the beads that are recycled are not further processed, for example by thermal curing, treating with either an acid or a base, or by coating the beads, prior to being recycled.

Thus, in one aspect, the previously formed beads to be recycled are not further cured prior to recycling, for example by thermal curing. Similarly, in another aspect, the previously formed beads to be recycled are not treated, for example with an acid or a base, and are at most removed from the reaction mixture and rinsed with water prior to recycling. In another aspect, the previously formed beads to be recycled are not substantially dried prior to being recycled, but are simply provided to the reaction mixture in a water-wet state as a result, for example, of physical filtering of the material, optionally with sorting carried out based on the size of the particles. In a similar aspect, the previously formed beads are not coated prior to recycling with an additional material such as, for example, a wax, carnauba wax, gum arabic, or the like, prior to recycling. In this aspect, the recycled beads are thus not coated prior to being recycled.

In one aspect, the resol beads of the invention, when isolated from the reaction mixture in which they are formed, and optionally washed only with water, include measurable amounts of nitrogen, derived for example from the use of ammonia or ammonium hydroxide as catalyst, either as such or provided by hexamethylenetetramine used as a source of both ammonia and formaldehyde. In various aspects, the amount of nitrogen present in the resol beads of the invention isolated from the reaction mixture may be, for example, at least 0.5% nitrogen, or at least 0.8%, or at least 1%, up to about 2.0% nitrogen, or up to 2.5%, or up to 2.6%, or up to 3%, or more, nitrogen. The amount of nitrogen may be measured, for example, as elemental analysis carried out using a ThermoFinnigan FlashEA™ 112 Elemental Analyzer. In a particular aspect, the amount of nitrogen is from about 1% to about 2.6%, based on elemental analysis carried out on a ThermoFinnigan FlashEA™ 112 Elemental Analyzer.

The resol beads of the invention isolated from the reaction mixture are further characterized as containing material, including phenol, hydroxymethyl phenol, and oligomers, that can be extracted into methanol. The extractable material includes nitrogen, typically in an amount less than about 1.1% nitrogen, by weight of the resol beads. The total amount of extractable material typically comprises, for example, from about 1% to about 20%, or from 3% to 15%, of the mass of the resin beads.

Interestingly, we have found that the extracting of this material does not substantially affect the recyclability of the beads, that is, the use of the previously formed beads as seeds. Without wishing to be bound by theory, the recyclability of the beads appears instead to be a function of the degree of cross-linking in the resin bead.

Thus, in one aspect, the previously-formed resol beads useful according to the invention are relatively insoluble in methanol, that is, are soluble in amounts up to about 15 wt. %, or up to about 20 wt. %, or up to about 25 wt. %, in each case based on the weight of the beads prior to methanol extraction.

We have found that the resol beads of the invention useful as previously-formed beads are typically yellow in color, based on visual inspection. This is contrasted with cured beads, which typically appear to be light brown, tan, or red in color. The reason for this is unclear, but this phenomenon likewise appears to be a function of the amount of cross-linking in the resol polymer.

In another aspect, we have found that active beads, that is, beads that are useful as seeds, or previously-formed beads, typically have a $T_g$ from about 30° C. to about 120° C., or from about 30° C. to about 68° C., as measured by DSC. This is contrasted with beads that have lost substantial activity as previously-formed beads, and are characterized as having no measurable $T_g$. As is methanol solubility, this is seen to be a measure of the cross-linking of the resol polymer of which the beads are formed.

In yet another aspect, previously formed beads that are useful as seeds are typically swellable in DMSO to at least 110% of their original diameter. This, likewise, is a measure of cross-linking. Previously formed beads that have lost substantial activity as seeds typically do not appreciably swell in DMSO. Without wishing to be bound by theory, this appears also to be a function of the amount of cross-linking.

The resol beads of the invention, for example when isolated as an aqueous suspension of resol beads from a reaction mixture in which they are formed, are relatively insoluble in acetone. This relative insolubility in acetone may likewise be considered a measure of the degree of polymerization or cross-linking which has occurred in the beads. The acetone solubility of the resol beads obtained may thus be, for example, no more than about 5%, or no more than 10%, or no more than 15%, or no more than 20%, or no more than 25%, or no more than 26%, or no more than 30%, or no more than 45%, in each case as measured by comparison of the weight of residue produced by evaporation of the acetone solvent to the starting weight of the beads. Alternatively, the amount of acetone solubility may be from about 5% to about 45%, or from 10% to 30%, or from 10% to 26%, in each case as measured by comparison of the weight of residue produced by evaporation of the acetone solvent to the starting weight of the beads.

Factors that are believed to affect the amount of acetone solubility include the temperatures at which the reaction is carried out, and the length of time during which the reaction is carried out. Advantages of avoiding substantial amounts of acetone solubility include handling of the product, e.g. drying and storage. Beads having substantial acetone solubility would be expected to be difficult to process, for example sticking together and forming clumps.

The resol beads of the invention are further characterized as being relatively infusible, that is, resistant to melting. Thus, when the beads are heated, the resin does not flow, but eventually produces a char. This property likewise is a function of the degree of polymerization or cross-linking that has taken place in the beads, and can be considered characteristic of resol polymers as distinguished from novolak polymers, in which substantial cross-linking requires the use of a separate cross-linking agent, often called a curing agent.

Similarly, the resol beads of the invention do not substantially deform when shear is applied, but rather tend to shatter or fragment. This, likewise, is an indication of substantial cross-linking having taken place.

The density of the resol beads isolated from the reaction mixture is typically at least 0.3 g/mL, or at least 0.4 g/mL or at least 0.5 g/mL, up to about 1.2 g/mL or up to about 1.3 g/mL, or from about 0.5 to about 1.3 g/mL.

In yet another aspect, the invention relates to activated carbon beads having a desired particle size and particle size distribution, the activated carbon beads comprising the reaction product of a phenol with an aldehyde as already described, for example carried out in the presence of a base as catalyst, reacted in an agitated aqueous medium that includes a colloidal stabilizer, and optionally a surfactant, and thereafter thermally treated, with agitation, carbonized, and activated, via one or more intermediate processing steps, as further described herein. In yet another aspect, the invention relates to methods of producing the activated carbon beads just described.

Thus, in one aspect, the invention provides resol beads having a relatively narrow size distribution in high yield by reaction of phenol, formaldehyde, and ammonia in an aqueous environment in the presence of a protective colloidal stabilizer, the improvement being the addition of previously-formed resol beads having a limited size distribution and a size smaller than the size of the desired product.

In yet another aspect, the invention relates to processes for producing resol beads, the processes including a step of reacting a phenol with an aldehyde in the presence of a base as catalyst, in an agitated aqueous medium that includes a colloidal stabilizer, and optionally a surfactant, in the presence of previously-formed resol beads, wherein the amount of methanol in the reaction mixture is limited. Methanol is typically present in formaldehyde solutions and acts as an inhibitor to prevent para-formaldehyde from precipitating out of solution. We have found that limiting the amount of methanol in the reaction mixture of such processes may, in some embodiments, give advantages in terms of the particle size distribution that is formed, resulting in a greater proportion of larger sized beads. These larger size beads may be desirable for downstream processing, as they yield a carbonized product with desirable adsorption properties, and the size of the particles provides easier processing of the particles during manufacture and use.

In yet another aspect, the invention relates to activated carbon monoliths made by a process in which resol beads, still containing a reactive surface, for example by omitting or modifying the step of heating as just described, are isolated and dried at a relatively low temperature, for example at 100° C. or less, or at 75° C. or less, or at 50° C. or less, or at about 45° C., or even less. The beads may afterward be carbonized, for example without significant agitation, and with or without compaction, at a temperature of at least about 500° C., such that crosslinking occurs in the beads, and at the contact points between the beads, resulting in the formation of a resol monolith. Other additives may be included but are not required in order to obtain the resol monolith. The resulting resol monolith may be activated, for example in steam or carbon dioxide for a period of time and at a temperature, for example of about 800° C. to about 1,000° C. or more, sufficient to form a monolith of activated carbon with microporous solids and an interstitial network of macropores/transport pores based on the particle size and particle size distribution of the resol beads used. The carbonization and activation steps may be combined, in those cases in which the carbonization conditions are suitable also for activation. The resulting activated carbon monolith may be used, for example, for gas phase adsorption or storage, or as a gas delivery system.

The activated carbon monoliths according to the invention are not particularly limited with respect to size, and the size of the monoliths may vary within a wide range. For example, the size of the monolith may be entirely a function of the size of the batch of resol beads that is used to form the monolith, with the practical limit being the size of the vessel used to contain the beads that form the monolith, so as to form monoliths having a diameter or width that is at least 10,000 times the median particle size of the resol beads, or at least 100,000 times the median particle size of the resol beads. Alternatively, a batch of beads may be at least partially cured and carbonized while in contact with one another, and thereafter ground so that the monoliths are an aggregate of individual beads, for example having a width or diameter from 10 to 10,000 or more times the average diameter of the resol beads from which the monolith is formed. As yet alternative, the monolith may be ground after or during carbonization or activation so as to form particles which are aggregates of individual resol beads, for example having a diameter from 10 to 100 times the median particle size of the individual resol beads from which the monolith was formed. Based on the intended use, these smaller monolith particles may have certain advantages over monoliths comprised of a sizeable batch of beads, with respect to size and flow properties.

In yet another aspect, the invention relates to activated carbon beads having a desired particle size and particle size distribution, the activated carbon beads comprising the reaction product of a phenol with an aldehyde carried out in the presence of a base as catalyst, reacted in an agitated aqueous medium that includes a colloidal stabilizer, and optionally a surfactant, and thereafter thermally treated, with agitation, carbonized, and activated, via one or more intermediate processing steps, as further described herein.

In yet another aspect, the invention relates to processes that prevent the sticking and fusion of resol beads during curing and carbonization, the processes including a step of heating the resol beads under conditions whereby the resol beads are in motion. The heating may be carried out in a fluid such as a liquid or a gas, or in a vacuum. We have found that, in the formation of resol beads from an aldehyde and a phenol carried out in an agitated aqueous medium, if the beads are removed from the reaction mixture and thereafter subjected to a step of heating the resol beads under conditions whereby the resol beads are in motion, sticking during subsequent processing may be thereby reduced or avoided. This step of heating may be carried out in a liquid, a gas, or a vacuum, but typically in a medium other than the reaction medium itself. If this step of heating is omitted, a resol monolith may be obtained, as further described herein, that may be carbonized and activated to obtain an activated carbon monolith useful for gas phase adsorption or storage.

Thus, in one aspect, the invention relates to resol beads having a desired particle size and particle size distribution, the resol beads comprising the reaction product of a phenol and an aldehyde, reacted in a basic, agitated aqueous medium that includes previously-formed resol beads, a colloidal stabilizer, and optionally a surfactant. The processes according to the invention may be carried out batch-wise, in semi-batch fashion, continuously, or semi-continuously, as further described elsewhere herein.

As used herein, the term "beads" is intended to refer simply to approximately spherical or round particles, and in some embodiments, the shape may serve to improve the flow properties of the beads during subsequent processing or use. The resol beads obtained according to the invention will typically be approximately spherical, but with a range of sphericity (SPHT) values. Sphericity, as a measure of the roundness of a particle, may be calculated using the following equation:

$$SPHT = \frac{4\pi A}{U^2}$$

in which SPHT is the sphericity value obtained;
U is the measured circumference of a particle; and
A is the measured (projected) surface area of a particle.

For an ideal sphere, the calculated SPHT would be 1.0; any less spherical particles would have an SPHT value less than 1.

The sphericity values of the resol beads of the invention referred to herein, as well as those of the activated carbon beads of the invention referred to herein, may be determined using a CamSizer, available from Retsch Technology GmbH, Haan, Germany, the CamSizer being calibrated using NIST Traceable Glass Microspheres, available from Whitehouse Scientific, Catalog Number XX025, Glass Microsphere calibration standards, 366+/−2 microns, 90% between 217 and 590 microns.

The resol beads obtained according to the claimed invention will typically have SPHT values, for example, of at least about 0.80, or at least about 0.85, or at least 0.90, or even at least 0.95. Suitable ranges of sphericity values may thus range, for example, from about 0.80 to 1.0, or from 0.85 to 1.0, or from 0.90 to 0.99.

The term resol is likewise not intended to be particularly limited, referring to the reaction product of a phenol and an aldehyde in which the reaction is carried out in the presence of a base as catalyst. Typically, the aldehyde is provided in molar excess. The term resol is not intended, as used herein, to refer only to prepolymer particles having only a minor amount of cross-linking or polymerization having taken place, but instead refers to the reaction product at any stage from the initial reaction of a phenol with an aldehyde through the thermosetting stage when significant crosslinking has occurred.

The resol beads according to the invention may be used for a variety of purposes for which resol beads are known to be useful, and find ready application in the formation of activated carbon beads when thermally treated and subjected to carbonization and activation, as further described below, for a wide range of end uses, such as in cigarette filters, in clothing for protecting persons from chemical and biological warfare agents, as medical adsorbents, for gas masks used in chemical spill cleanup, and the like.

The term "cured resol beads" is intended to describe resol beads, as just described, which have been thermally cured to reduce the tendency of the resol beads to stick to one another, as further described herein. The cured resol beads may be useful in a for a variety of purposes for which resol beads are known to be useful, including those in which the resol polymer of which the beads are comprised has not yet substantially cross-linked, the amount of curing in some instances being only that needed to reduce the tendency of the resol beads to stick to one another. The times, temperatures, and conditions under which the resol beads are thermally cured to obtain the cured resol beads of the invention are as further defined herein.

The general terms "phenol" and "one or more phenols" as used herein mean phenols of the type that form condensation products with aldehydes, including, in addition to phenol (monohydroxybenzene), other monohydric and dihydric phenols such as phenol, pyrocatechol, resorcinol, or hydroquinone; alkyl-substituted phenols such as cresols or xylenols; binuclear or polynuclear monohydric or polyhydric phenols such as naphthols, p,p'-dihydroxydiphenyl dimethylmethane or hydroxyanthracenes; and compounds which, in addition to containing phenolic hydroxyl groups, include such additional functional groups as phenol sulfonic acids or phenol carboxylic acids, such as salicylic acid; or compounds capable of reacting as phenolic hydroxyls, such as phenol ethers. Phenol itself is especially suitable for use as a reactant, is readily available, and is more economical than most of the phenols just described. The phenols used according to the invention may be supplemented with nonphenolic compounds such as urea, substituted ureas, melamine, guanamine, or dicyandiamine, for example, which are able to react with aldehydes as do phenols. These and other suitable compounds are described in U.S. Pat. No. 3,960,761, the relevant portion of which is incorporated herein by reference.

In one aspect, the phenol used is one or more monohydric phenols, present in an amount of at least 50%, with respect to the total weight of the phenols used, or at least 60%, or at least 75%, or at least 90%, or even at least 95% monohydric phenols, in each instance based on the total weight of the phenols used.

In another aspect, the phenol used is phenol, that is, monohydroxybenzene, for example present in an amount of at least 50%, with respect to the total weight of the phenols used, or at least 60%, or at least 75%, or at least 90%, or even at least 95%, in each instance based on the total weight of the phenols used.

The general terms "aldehyde" and "one or more aldehydes" include, in addition to formaldehyde, polymers of formaldehyde such as paraformaldehyde or polyoxymethylene, acetaldehyde, additional aliphatic or aromatic, monohydric or polyhydric, saturated or unsaturated aldehydes such as butyraldehyde, benzaldehyde, salicylaldehyde, furfural, acrolein, crotonaldehyde, glyoxal, or mixtures of these. Especially suitable aldehydes include formaldehyde, metaldehyde, paraldehyde, acetaldehyde, and benzaldehyde. Formaldehyde is particularly suitable, is economical, and is readily available. Equivalents of formaldehyde for purposes of the present invention include paraformaldehyde, as well as hexamethylenetetramine which, when used according to the invention, also provides a source of ammonia. These and other suitable aldehydes are described in U.S. Pat. No. 3,960,761, the relevant portion of which is incorporated herein by reference.

When formaldehyde is used as an aldehyde, it may be added as a 37% solution of para-formaldehyde in water and alcohol, called formalin. The alcohol is usually methanol, and is typically present in such solutions at a concentration average of approximately 7-11% based on the formaldehyde sample. The methanol is a good solvent for the para-formaldehyde and acts to keep the para-formaldehyde from precipitating from solution. The formalin can thus be stored and processed at low temperatures (<23° C.) without para-formaldehyde precipitating from solution. However, as further described below, we have found that much less methanol can be used to deliver formaldehyde to the reaction than is typically used, and that solutions having less methanol provide certain advantages. Thus, one aspect of the invention relates to processes of producing resol beads in which the amount of methanol is limited.

In one aspect, the aldehyde used is one or more alkyl aldehydes having from one to three carbon atoms and present in an amount of at least 50%, with respect to the total weight of the aldehydes used, or at least 60%, or at least 75%, or at least 90%, or even at least 95%, in each instance based on the total weight of the aldehydes used.

In another aspect, the aldehyde used is formaldehyde, for example present in an amount of at least 50%, with respect to the total weight of the aldehydes used, or at least 60%, or at least 75%, or at least 90%, or even at least 95%, in each instance based on the total weight of the aldehydes used.

The processes according to the invention are carried out in the presence of a base as catalyst, such that the aqueous reaction medium is typically a basic aqueous medium, that is, an alkaline medium, having a pH, for example, greater than 7, or at least 7.5, or at least 8, up to about 11, or up to about 12, or from about 7 to about 12, or from 7.5 to 11. However, the processes according to the invention may be carried out in aqueous media that is not alkaline, for example if ammonium chloride, or the like, is used as a base. Further, the pH may change during the course of the reaction, such that the pH values may be those obtained at the start of the processes by which the resol beads of the invention are obtained.

A variety of organic or inorganic bases may be used as catalysts, including but not limited to ammonia or ammonium hydroxide; amines such as ethylene diamine, diethylene triamine, hexamethylenediamine, hexamethylenetetramine, or polyethylenimine; and metal hydroxides, oxides, or carbonates, such as sodium hydroxide, potassium hydroxide, calcium hydroxide, calcium oxide, barium hydroxide, barium oxide, sodium carbonate; and the like. It is understood that various bases used may exist in an aqueous medium as hydroxides, in whole or in part, for example ammonia or ammonium hydroxide.

In the processes according to the invention, the amount of water in the aqueous medium is not particularly critical, although it will be most economical that the reaction not be carried out in a dilute aqueous medium. The amount of water used will be at least an amount that will permit the formation of a phenolic resin-in-water dispersion, typically at least about 50 parts by weight of water per 100 parts by weight of the resol beads obtained. There is no advantage to using a large amount of water, and in fact, the reaction will likely proceed more slowly when excess water is used, although the invention will work even with a large excess of water. Typical levels of water with respect to the organic reactants will thus typically be from about 30 to about 70 wt %, or from 50 wt % to 70 wt %. Thus, the amount of water may vary within a relatively wide range, for example from about 25 to about 95 wt. %, or from 30 to 80 wt. %, or from 35 to 75 wt. %.

The colloidal stabilizers useful according to the invention serve to promote or maintain a phenolic resin-in-water dispersion such that resol beads are formed in the aqueous medium during the course of the reaction. A wide variety of such agents may be used including, without limitation, naturally-derived gums such as gum arabic, gum ghatti, algin gum, locust bean gum, guar gum, or hydroxyalkyl guar gum; cellulosics such as carboxy-methylcellulose, hydroxyethyl cellulose, their sodium salts, and the like; partially hydrolyzed polyvinyl alcohol; soluble starch; agar; polyoxyethylenated alkylphenols; polyoxyethylenated straight-chain and branched-chain alcohols; long-chain alkyl aryl compounds; long-chain perfluoroalkyl compounds; high molecular weight propylene oxide polymers; polysiloxane polymers; and the like. These and other agents are further described, for example, in U.S. Pat. No. 4,206,095, the relevant portion of which is incorporated herein by reference.

The colloidal stabilizers are used in amounts sufficient to promote the formation or stabilization of a phenolic resin-in-water dispersion as the resol beads are formed. They may be added at the start of the reaction, or may be added after some initial polymerization has taken place. It is sufficient that the dispersion be stable while the reaction mixture is being agitated, the agitation thus assisting the colloidal stabilizers in maintaining the desired dispersion.

It is typical to use the colloidal stabilizers in relatively small amounts, for example from about 0.05 to about 2 weight percent, or from 0.1 to 1.5 weight percent, in each case based on the weight of phenol. Alternatively, the colloidal stabilizers may be used in amounts up to 2 weight percent, or up to 3 weight percent or more, based on the weight of phenol. Typically from about 0.2 weight percent to about 1 weight percent, based on weight of phenol, is a good starting point for developing suitable formulations.

A variety of carboxymethylcelluloses may be used according to the invention as colloidal stabilizers, having a variety of degrees of substitution, for example, at least 0.4, or at least 0.5, or at least 0.6, up to about 1.2, or up to about 1.5, or from about 0.4 to about 1.5, or from 0.6 to 1.2, or from 0.8 to 1.1. Similarly, the molecular weight of the carbyoxymethylcellulose may also vary, for example from about 100,000 to about 750,000, or from 150,000 to 500,000, or a typical average of about 250,000.

We have found carboxymethylcellulose sodium to be especially well-suited for use according to the invention.

We have found that products made using certain guar gums resulted in particles that were often rough textured and contained large amounts of fused beads or agglomerates.

The processes according to the invention may optionally be carried out in the presence of one or more surface active agents, hereinafter surfactants, and indeed in the absence of seed particles, it may be helpful to provide a surfactant in order to obtain desired properties in the resol beads formed.

Surfactants useful according to the invention include anionic surfactants, cationic surfactants, and nonionic surfactants. Examples of anionic surfactants include, but are not limited to, carboxylates, phosphates, sulfonates, sulfates, sulfoacetates, and free acids of these salts, and the like. Cationic surfactants include salts of long chain amines, diamines and polyamines, quaternary ammonium salts, polyoxyethylenated long-chain amines, long-chain alkyl pyridinium salts, lanolin quaternary salts, and the like. Non-ionic surfactants include long-chain alkyl amine oxides, polyoxyethylenated alkylphenols, polyoxyethylenated straight-chain and branched-chain alcohols, alkoxylated lanolin waxes, polyethylene glycol monoethers, dodecylhexaoxylene glycol monoethers, and the like.

We have found sodium dodecylsulfate (SDS) to be well-suited for use according to the invention.

Other anionic surfactants are also well-suited for use according to the invention, and although the surfactant may be omitted and acceptable product having a relatively narrow size distribution obtained, the presence of a surfactant appears to aid the formation of a more spherical product.

In the processes according to the invention by which the resol beads are prepared, the reaction is carried out in an agitated aqueous medium, the agitation provided being sufficient to provide a phenolic resin-in-water dispersion such that resol beads are obtained having a desired particle size. The agitation may be provided in a reaction vessel by a variety of methods, including but not limited to pitched blade impellers, high efficiency impellers, turbines, anchor, and spiral type agitators. The reaction mixture may be agitated at a relatively slow rate, which is dependant in part upon the size of the vessel, with, for example, an anchor-shaped stirring paddle. Alternatively, the agitation may be provided, for example, by the mixing caused by flow induced by internal or external circulation, by cocurrent flow or counter-current flow, for example with respect to a flow of reactants, or by flowing the reaction medium past one or more stationary mixing devices, such as static mixers.

An advantage of the present invention, as described herein, is the ability to obtain a desired particle size and particle size distribution. The particle size distribution of resol beads obtained according to the invention, as defined herein, may be that measured following the isolation techniques described below.

After the reactions are completed and resol beads obtained, the resol beads of useful size are obtained by cooling the product mixture to a temperature from about 20° C. to about 40° C., and the slurry is drained from the reactor into a transfer vessel having an agitation device so that solids may be suspended in the vessel when desired. The contents of the vessel are first allowed to stand for a period from about 15 to about 60 minutes (without agitation) to allow a bed of particles to form at the base of the vessel. A clear separation between the lower bed of particles and the upper liquid phase will be visible when the settling process has been completed. Typically, the liquid has a milky appearance and has a viscosity in the range from 0.10 to 20 cP. The presence of a large number of sub-5 micron particles gives the liquid phase this milky appearance.

From the settled slurry suspension, the liquid phase is decanted from the top of the vessel until the separation line between the settled bed of particles has been reached. This decantation process will remove the majority of the liquid in the vessel. The quantity remaining in the bed of particles will be from about 5% to about 30% of the total amount of liquid originally present in the slurry. Contained in the decanted liquid phase are a large quantity of sub-5 micron particles that are still suspended in the liquid phase that will be removed from the vessel. This quantity of suspended solids represents from about 0.10% to about 5% of the total yield of solids from the process.

To the bed of solids, an amount of water is added that is approximately equivalent to the amount of decanted liquid removed from the vessel. The contents of the vessel are then re-suspended using an agitation device such that the concentration of the solid phase is homogeneous throughout the vessel. The mixing is typically continued for at least 10 minutes.

The impeller is then switched off and the slurry is allowed to settle once again to form a bed of solids at the base of the vessel. The slurry is allowed to settle for about 15 to about 60 minutes until a discrete interface between the bed of solids and the liquid can be seen.

The procedure for washing the solids described above is repeated a further 2 to 4 times until the liquid phase is substantially clear and free of any suspended solids.

The slurry is then re-suspended, using the agitator, and the contents of the vessel are poured onto a filter. Once the slurry has been poured on to the filter, vacuum is applied to the bed of solids to separate the liquid phase from the solid phase. The vacuum is maintained until the liquid has been removed from the cake. The time needed to do this will depend on the resistance offered by the bed of solids and the filtration medium. Typically, for particle sizes in the range 100 to 700 um and a filter element having an average pore size of 40 um, this process will take from about 5 to about 60 minutes.

After liquid has been removed from the cake, nitrogen gas at room temperature and pressure is fed to the top of the cake. The gas is drawn through the cake using the vacuum located at the base of the bed. The gas is drawn through the cake for from 1 to 12 hours, until the bed of solids has been dried. The moisture content of the cake should be below 1% on a total solids basis. The dry solids are removed from the filter.

The particle size distribution of the dry solids can be determined by a number of methods. For example, a selection of sieves may be used to fractionate the solids into separate groups. For example, for a distribution containing particles in the size range from 50 to 650 um, the initial sieve fraction could be between 50 and 150 um. The second could be between 150 and 250 um, and so on in 100 um increments up to 650 um. Alternatively, sieve fractions could be selected to yield fractions of 50 um instead of 100 um.

By fractionating the solids into different fractions, a particle size distribution can be generated that expresses the fraction (volume or weight) of the distribution present at the median size of each sieve fraction. In the sieving procedure, sufficient time should be given to allow the mass of particles in each fraction to reach a steady-state mass. For this a time from about 1 to about 24 hours are typically required, or sufficient time such that the mass on each sieve screen reaches 99% of it's final steady state value, or until the mass on each screen does not change by more than 0.10% of the mass on that sieve fraction over a period of 5 hours, for example.

Another method of measuring the particle size distribution is to use a forward laser light scattering device. Such a device can yield a volume fraction distribution of particles as a function of particle size. The device operates by passing a sample of particles suspended in a non-absorbing liquid medium into the path of a laser beam. A particle modifies the laser light which falls upon it by the two basic mechanisms of scattering and absorption. Light scattering includes diffraction of the light around the edges of the particle surface, reflection from the particle surface, and refraction through the particle. The result of refraction of the light through the particle results in a distribution of scattered light in all directions.

The scattered light is focused on to a photodiode detector array that is located at a distance from the measurement plane. The detector is comprised of an array of discrete photodiodes arranged in semi-circular fashion. The diffraction angle of the incident light is inversely proportional to the size of the particle that diffracts the light. Therefore, the outermost diodes collect signals from the smallest detectable particles and the innermost diodes collect signals from the largest detectable sizes. From an understanding of the theory of light scattering and a knowledge of the system geometry, a particle size distribution can be re-constructed from the diffraction pattern in terms of the number of volume distribution. An example of a device useful for such measurements is the Malvern Mastersizer 2000 that measures in the size range 0.20 to 2000 microns and is sold by Malvern Instruments Ltd. (Malvern, UK). Another such instrument is the Beckman Coulter LS 230 that can measure in the 0.02 to 2000 micron range and is sold by Beckman Coulter Inc. (Fullerton, Calif., USA). Both instruments operate on the above principal and are sold with accompanying proprietary software.

From the distribution determined from either of the above techniques, certain characteristic sizes of the distribution can be calculated. Characteristic sizes are used to compare distributions of particles from different experiments to determine the effect of the processing conditions on the size distribution of particles produced. For example, the 10% characteristic size ($d_{10}$) of a distribution can be determined. The $d_{10}$ characteristic size represents a particle size in which 10% of the volume of all particles is composed of particles smaller than the stated $d_{10}$ and conversely, it is the size in which 90% of the volume of all particles is composed of particles larger than the stated $d_{10}$. Similarly, the $d_{90}$ characteristic size represents a particle size in which 90% of the volume of all particles is composed of particles smaller than the stated $d_{90}$ and conversely, it is the size in which 10% of the volume of all particles is composed of particles larger than the stated $d_{90}$. Similarly, the 50% size ($d_{50}$) is the size below and above which 50% of the volume of all solids from the batch lies. The $d_{50}$ is also termed the median size.

To represent the particle size distribution determined from a sieving procedure, the median size of a sieve fraction is determined. The particle size distribution determined from a sieving technique is a mass based distribution, which for a system with uniform density is equivalent to a volume based distribution. The median size ($d_{50}$) of the distribution is the size above and below which lay 50% of the volume of particles ($V_{50}$).

The diameter of the largest particle in a sieve fraction is the diameter of the screen opening in the upper sieve fraction ($d_{upper}$) and the diameter of the smallest particle in a sieve fraction is the diameter of the screen opening in the lower sieve fraction ($d_{lower}$). The volume of the smallest particles in a sieve fraction can thus be calculated from the following general formula:

$$V_{lower} = \frac{\pi}{6} d_{lower}^3.$$

The median size of a sieve fraction is obtained from the following formula that expresses the volume above and below which 50% of the volume in the sieve fraction lays, $$V_{50} = \frac{V_{upper} + V_{lower}}{2}.$$

Canceling terms in the above equation, the following formula for sieve median size can be derived, $$d_{50} = \sqrt[3]{\frac{d_{upper}^3 + d_{lower}^3}{2}}.$$

For the examples described in the present application, the median sieve size is used when plotting the mass distribution of particles as a function of size.

To calculate the $d_{10}$ or the $d_{90}$ of a distribution, a cumulative graph of the distribution is plotted with the median sieve size of each sieve fraction on the x-axis and the cumulative mass fraction on the y-axis. The $d_{10}$ or the $d_{90}$ sizes can be read off the graph by reading the size that corresponds to 10% and 90% of the cumulative total of mass or volume fraction on the graph.

For a particle size distribution measured by laser light scattering, a similar procedure is used to determine the $d_{10}$ or the $d_{90}$ sizes. The cumulative mass or volume fraction is plotted against the reported size and the size that corresponds to 10% and 90% of the cumulative total of mass or volume fraction on the graph can be read.

Particle size distribution, as used herein to define resol bead size distribution or activated carbon bead size distribution, may be expressed by as a "span (S)," where S is calculated by the following equation:

$$S = d_{90} - d_{10}$$

where $d_{90}$ represents a particle size in which 90% of the volume is composed of particles smaller than the stated $d_{90}$; and $d_{10}$ represents a particle size in which 10% of the volume is composed of particles smaller than the stated $d_{10}$; and $d_{50}$ represents a particle size in which 50% of the volume is composed of particles larger than the stated $d_{50}$ value, and 50% of the volume is composed of particles smaller than the stated $d_{50}$ value.

A range of particle size distributions may be obtained according to the invention following the isolation techniques just described. For example, span values from about 25 microns to about 750 microns may be achieved, or from about 50 to about 500 microns, or from about 75 microns to about 375 microns, the span being defined above as the $d_{90}$ particle size minus the $d_{10}$ particle size. Typical $d_{50}$ particle size values for the spans just described might be from about 10 um to about 2 mm or more, or from 50 microns to 1 mm, or from 100 microns to 750 microns, or from 250 microns to 650 microns.

Alternatively, span values from 100 to 225 microns may be achieved in which greater than 20% of the weight of the distribution is in the size range greater than 425 microns. In a further alternative, a span from 100 to 160 microns in which at least 50% of the weight of the distribution, or at least 65% by weight, or at least 75% by weight are present as particles greater than 425 microns may be achieved following the isolation techniques described.

In one embodiment, the resol beads according to the invention may be prepared, for example, by reacting in an agitated aqueous medium a phenol and an aldehyde, in the presence of a base such as ammonium hydroxide provided as a catalyst, a colloidal stabilizer such as carboxymethylcellulose sodium (for example having a degree of substitution of about 0.9), and optionally a surfactant such as sodium dodecylsulfate.

The processes described herein will be generally carried out for a period of time and at a temperature sufficient to produce an aqueous dispersion of resol beads.

Thus, the reaction may be carried out, for example, at a temperature from about 50° C. to about 100° C., or from 60° C. to 950, or from 75° C. to 90° C.

Similarly, the length of time the reaction is allowed to run may vary based on temperature, for example, from about 1 hour, or less, up to about 10 hours, or more, or from 1 hour to 10 hours, or from 1 hour to 8 hours, or from 2 hours to 5 hours. In certain embodiments, we have held the reaction mixture at a temperature of about 70° C. for about 5 hours, and then raised the temperature to about 90° C. for about 1 hour. Alternatively, we have held the reaction mixture at a temperature of about 85° C. for about 4 hours, and then raised the temperature to about 90° C. for about 30 minutes to 1 hour. Another alternative would be to hold the reaction mixture at a temperature of about 85° C. for about 2 hours, and then to raise the temperature to about 90° C. for about 1 hour. The use of substituted phenols may require higher reaction temperatures than when using phenol, that is, monohydroxybenzene.

The processes according to the invention will typically be carried out at temperatures such as those already described, and at pressures at which emulsion polymerizations are typically carried out. It may be advantageous in some instances that the reaction pressure be maintained at pressures greater than 1 atmosphere, in order to obtain beads having a density greater than that obtained at lower reaction pressures. This is because, if pockets of gaseous byproducts are trapped within the beads, it is reasonable to expect that higher reaction pressures would decrease the volume of the gaseous pockets and result in a denser product.

The particle sizes of the resol beads prepared according to the invention may vary within a wide range as measured using the measurement techniques already described, for example having a median particle size, or $d_{50}$, of from 10 μm up to 2 mm, or up to 3 mm, or more, especially in those cases in which beads are recycled, the beads typically growing at a rate of up to about 200 microns per pass. Alternatively, the median particle size may fall within the range from 25 μm to 1,500 μm, or from 50 μm to 1,000 μm, or from 100 μm to 750 μm, or from 250 μm to 500 μm. With the median particle sizes just described, the span might be, for example, from 25 microns to 750 microns, or from 50 to 500 microns, or from 75 microns to 375 microns, or from 75 microns to 200 microns, or as already described. The beads may alternatively grow at a rate from about 25 microns to about 250 microns, or from 50 microns to 200 microns, or from 100 microns to 200 microns, in each case per pass through a reaction medium.

A range of particle sizes and particle size distributions may be achieved according to the invention, and we have found that the use of previously-formed resol beads as seed particles allows more control of these variables than prior art processes.

Thus, in one aspect, the resol beads according to the invention may have a relatively large particle size, and a relatively narrow particle size distribution, when compared to what has heretofore been achieved, as already described.

When previously-formed resol beads are used as seed particles, the size of the previously-formed resol beads used can vary within a wide range or given size fraction, and will be selected based on the sizes or fractions available, as well as on the desired particle size and particle size distribution of the final resol beads. Thus, the median particle size or $d_{50}$, of the previously-formed resol beads may be, for example, at least about 1 μm, or at least 10 μm, or at least 50 μm, up to about 500 μm, or up to 1 mm, or up to 1.5 mm, or even up to 2 mm or greater. Alternatively, the median particle size of the previously formed beads may be in the range from about 1 μm to about 2 mm, or from 10 μm to 1,500 μm, or from 50 μm to 1,000 μm, or from 100 μm to 750 μm, or from 125 μm to 300 μm. The suitable particle size for the previously-formed resol beads will be selected based on the desired particle size of the finished particle.

Similarly, previously-formed resol beads having a range of particle size distributions are useful according to the invention, the distribution selected being based in part on the size fractions available, the need for a relatively uniform particle size in the resol beads obtained, and the avoidance of waste by using beads having a range of particle size distributions. Thus, previously-formed resol beads having span values from about 25 microns to about 750 microns may be used, or from about 50 to about 500 microns, or from about 75 microns to about 250 microns, the span being defined above as the difference between the $d_{90}$ particle size and the $d_{10}$ particle size.

In practice, in those embodiments in which previously formed beads are to be provided to subsequent reaction mixtures and in which an average particle size from about 300 μm to about 425 μm is desired, the beads may be formed as described elsewhere herein, and then dried and sieved into fractions, for example four fractions: those greater than about 425 μm (>425-μm); those from about 300 μm to about 425 μm (>300<425-μm); those from about 150 μm to about 300 μm (>150<300-μm); and those less than about 150 μm (<150-μm). By this means, the material<300-μm may be recycled to a subsequent batch. In the subsequent batch, the material>300-μm may thereby be substantially increased, resulting in a narrower size distribution. Without wishing to be bound by any theory, it appears that the smaller beads that are recycled to the reaction grow in size, thus increasing the yield of product in the 300-425 μm size range. By means of the use of the previously formed beads, a total yield of material in the 300-425 μm size range over 5 batches may be achieved that is similar to the total yield of product minus the yield of material<300-μm initially produced.

We have found that the final average bead size is dependent in part upon the size of the previously-formed resol beads used as recycled seed. Thus, the processes according to the invention provide the flexibility of tailoring the desired bead size by varying the size of the recycled seed that is used. For example, we found that use of seeds smaller than 150 micron results in increasing the yield of 150-350 micron product, while 150-300 micron seeds will increase the yield of beads greater than 425 microns. We have found also that the reactivity of the seeds is affected if the bead is allowed to cure. It may therefore be helpful to avoid curing or only partially curing, for example by heating, seeds that are to be recycled. We found that when the seeds to be recycled are cured in a separate step at elevated temperature, they did not appear to grow in size during the reaction as much as did uncured seeds.

When preparing the resol beads according to the invention, the average size of the beads may vary as a function of the agitation rate and the type of agitator used during the reaction. In general, rapid agitation results in smaller bead size while slow agitation results in larger beads. Slow agitation rates using a conventional pitched turbine blade or crescent blade may result in nucleation on the walls of reactor due to poor movement, leading to undesirable amounts of cake formation and excessive build up on reactor walls. This problem may be avoided by using an anchor-type agitator which, even at slow speeds, will sweep reactor walls during the reaction.

However, while the agitation rate provides some control over the average size of the beads, it typically does not provide as much control over the particle size distribution. Previously-formed resol beads therefore may be used according to the invention, in order to provide a measure of control over the particle size and particle size distribution.

A variety of particle sizes and particle size distributions may be used according to the invention as the previously-formed resol beads, as already described, and the size and size distribution may be selected so as to achieve the desired particle size and particle size distribution in the final product resol beads in light of the present disclosure.

Although seeds having a variety of particle sizes and particle size distributions may be used according to the invention, we have found that in some applications, the amount of recycled beads may be selected as a function of the ratio of the external surface area of the recycled beads to the amount of phenol used in the reaction.

The external surface area of the seeds was calculated using the average diameter of the seeds charged. For example, for a monodisperse distribution of particles wherein the maximum diameter of any particle is "d", the maximum cross-sectional area (Area) of the particle taken across the meridian plane of the particle can be calculated from the following formula:

$$\text{Area} = \pi d^2 (m^2)$$

The formula above calculates the surface of a single particle having a size of d. For example, if the value of d was 250 microns, the surface area would then be calculated as:

$$A_{particle} = \pi (250 \cdot 10^{-06})^2 = 1.964 \cdot 10^{-07} m^2$$

We have found that, should it be desirable to avoid formation of an excessive amount of small particles (fines), the total surface area of the recycled beads provided (in $m^2$) may desirably be, for example, at least five times greater than, or at least six times greater than, or at least seven or eight times greater than the amount of phenol (in kg).

We have found that, if the ratio is less than about eight, for example, there is substantially more nucleation of new particles than growth of existing particles. The number ratio of new particles generated during the reaction (from nucleation) is plotted against the surface area of recycled beads charged to the reaction per unit mass of phenol charged. When the surface area of the seeds is less than about 5 $m^2$ per kg of phenol, the number of new particles may increase dramatically. These new particles will be mainly small and present in the product as undesirable, fine powder.

Thus, if it is desirable to ensure that the growth of the initial seeds is promoted in the vessel and nucleation of fines particulates is suppressed, sufficient seeds of the appropriate size may be charged to the reactor such that the surface area (in $m^2$) of the seeds added to the reaction is at least 5 times the amount of phenol added to the vessel (in kg). These two measures: seeding with the desired particle size, and providing sufficient surface area, may yield a product having a larger proportion of product in a desired size range.

The temperature history of the previously formed beads used as seeds may be significant, in order to ensure that the surfaces of the beads remain active. For example, a limited curing step implemented at the end of each batch reaction at a temperature of about 90° C. for 45 minutes will typically be sufficient when the beads are to be recycled. We found that if treated in water at a temperature of 100° C., the surfaces of the beads were apparently deactivated, making it difficult for them to function as seeds to grow larger beads.

Thus, in one aspect, the resol beads according to the invention may have a relatively large particle size, and a relatively narrow particle size distribution, when compared to what has heretofore been achieved.

For example, when particles having a size range from about 425 to about 600 um are desired, particles smaller than 425 um may be considered suitable for use as seeds to be recycled for successive batches. However, particles in the size range of 150 to 300 um may be more desirable for use as seeds, as they may give a product yield of from 60 to 80% in the desired size range (425 to 600 um) during a given batch. The other 20 to 40% of the yield is present as over (>600 um) or undersize (<425 um) beads. We expect that some of the undersized beads are formed as a result of nucleation that has occurred during the batch, and that some of the undersized beads are the original seeds that have not grown to sizes exceeding 425 um. The oversized beads are probably the result of the seed particles growing to sizes larger than 600 um. Thus, the amount of under or oversized beads produced may be a function of several factors such as the nucleation rate, the activity of the beads, and the yield of the process.

When these relatively large particles are desired, particles in the 1 to 150 um size ranges might well be considered too fine to use as seeds. They result in a small yield of product-sized particles. Particles in the 300 to 425 um size range are also considered less suitable, as they will typically produce particles larger than 600 um and do not give the required yield of product.

Because a relatively wide distribution of particles is produced from each batch, it may not be practical to select an extremely narrow distribution as seed particles and still have enough material in the 150 to 300 um size class to act as seed. For this reason, a distribution of seeds is typically chosen to seed each batch.

Thus, in practice, a quantity of relatively mono-disperse seeds may be added to each reaction batch to act as sites for growth of a phenolic resin bead. The surface area of the seeds may be used to determine a suitable quantity of seed to be used. For example, for each kg of phenol charged to the batch reactor, the surface area of the seeds (in $m^2$) may be, for example, at least 5 times the weight of phenol (in kg) charged to the reactor, or at least 6 times the weight, or at least 7 times the weight of phenol used, calculated as already described.

When previously-formed resol beads are used as seeds to prepare the resol beads of the invention, the following steps may be used, for example, to produce the resol beads:

a) Charging to a reaction mixture all or a part of a phenol, an aldehyde such as formaldehyde, and a base such as ammonia (for example as ammonium hydroxide or hexamethylenetetramine) to an agitated aqueous medium containing a colloidal stabilizer and optionally a surfactant.

b) Charging a quantity of previously-formed resol beads to the reaction mixture having surface functionality reactive with one or more of the phenol or formaldehyde monomers. The quantity of seeds used may be sufficient, for example, to provide a surface exceeding 5 $m^2$ per kg of phenol added.

c) Heating the reaction mixture to a temperature from about 75° to about 85° C. and adding any remaining reactants (phenol, formaldehyde, ammonia) to the vessel in semi-batch mode during the course of the reaction.

d) Holding the reaction mixture at this temperature for about 5 hours or more.

e) Heating the reaction mixture to about 90° C. for about 45 minutes.

f) Cooling the reaction mixture to between about 10° C. to about 50° C. and separating the resulting resol beads from the liquid in the reaction mixture.

Alternative times and temperatures may be used as described elsewhere herein.

Typically, with each pass through the process, whether a particle is present that originates from a previously-formed bead provided or from a resol particle source, more reaction product is deposited on the surface. Thus, a particle increases in size each time it passes through the process. We have found that during a typical reaction conducted according to the invention, a particle size may increase, for example, by about 100 to 200 μm, or as already described.

The processes according to the invention may be carried out batch-wise, in which all of the reactants are provided to the reaction mixture together.

Alternatively, the processes may be carried out using various semi-batch additions as further described herein.

Without wishing to be bound to any particular theory, the following discussion sets out the mechanism by which the resol beads of the invention appear to form.

The condensation reaction of an aldehyde such as formaldehyde with a phenol in the presence of a base as catalyst in an agitated aqueous environment at elevated temperatures, for example at least 60° C., leads to the formation of a two-phase mixture, the aqueous phase containing unreacted formaldehyde, phenol, ammonia and lower order alcohols, the second phase containing higher order, non-crosslinked polymeric species formed as a result of the resol condensation reaction. The resol compounds oil-out from solution due to their high molecular weight. By using a colloidal stabilizer, the oil phase forms beads of polymeric material that are suspended in the stirred vessel as discrete droplets. Over the course of time, the cross-linking action of formaldehyde diffusing into the liquid droplets causes a further increase in the molecular weight of the polymer. The increase in molecular weight leads to the solidification of the oil droplets to form resol beads that can be filtered, washed and recovered for use as a dry polymeric material.

The colloidal stabilizer and the optional surfactant may be present in the reaction mixture from the start of the phenol/aldehyde condensation, or else the condensation reaction may be conducted to the stage that a low viscosity resin is produced, and the colloidal stabilizer and surfactant added thereafter, with more water if needed. Sufficient water will typically be provided such that a phase inversion takes place, yielding a resin-in-water dispersion, with water being the continuous phase. The resole solids concentrations may vary within a wide range, since the amount of water is not critical, with a typical solids content up to about 40 or 50 weight percent, based on the weight retained in the solids upon drying.

A suitable dispersion of the resin in water during the early stages of the process is achieved by applying agitation to the aqueous medium, the use of an agitator being a convenient way to provide the needed agitation in batch and semi-continuous processes, and such devices as in-line mixer devices being suitable for continuous processes.

The resol beads formed are substantially water-insoluble, the resins typically having a weight average molecular weight of at least about 300, or at least 400, or at least 500, up to about 2,000, or up to 2,500, or up to 3,000 or more. Of course, it may be difficult as a practical matter to determine molecular weight when a significant amount of cross-linking has taken place.

Depending upon the intended end-use, it is may be desirable to subject the resole to elevated temperature for a controlled period of time, optionally with an intervening neutralization step.

While we have found that batch processes result in serviceable beads, we have found that, in some cases, various semi-batch additions of reactants may result in a higher yield of the desired particle size and particle size distribution. Alternatively, continuous processes may provide certain advantages such as increased throughput and uniformity of product obtained.

According to further aspects of the invention, several semi-batch and staged modes of operation may be used, for example, in order to improve the yield or the particle size distribution obtained, such as to increase the amount of desired particles (>425 um) or to decrease the number of undesired fines particles (<150 um) made during the resol reaction.

By way of example, the following strategies may be used to yield advantages either in the yield of product or the quality of product (size), or both:

(i) Instead of adding all of the reactants to the reactor in batch mode, some or all of the phenol, surfactant, colloidal stabilizer, seed particles, and only a portion of the base and aldehyde may be added to the reactor at the start of the reaction, and the remaining aldehyde and base added in semi-batch mode over a period, for example, of 45 minutes. This strategy may minimize fines generation and maximize the distribution median size as measured by sieving the dried product.

(ii) In processes similar to those above in (i), the reactions may be conducted in stages. In such processes, perhaps a quarter of all the reactants are charged to the reactor with about half of the aldehyde and base being added in semi-batch mode. The reaction is allowed to proceed for 2 hours, before perhaps a further quarter of the ingredients are added to the reactor in the same manner as the first charge to the vessel with half of the aldehyde and base being added in semi-batch mode. The remaining two charges of materials may be added at further 2-hour intervals to the reactor in the same way. Seed particles are added during the first charge, the quantity added corresponding to the amount of phenol added in the first quarter charge, as already described. This type of strategy represents a staging of the process in order to grow a smaller amount of seeds to a larger size, and would be useful, for example, when only a small amount of seeds is available for use.

(iii) In further embodiments, similar to those described in (i) above, a further charge of a base, such as ammonia, is made, for example at about 2 hours after all of the initial base has been added to the vessel. The base is added to the vessel in semi-batch mode and the quantity used may be approximately the same as was originally charged to the reactor.

Thus, in one aspect, the invention relates to processes for producing resol beads, the processes including a step of providing a phenol, a portion of an aldehyde, and a portion of a base as catalyst to a reaction mixture which is an agitated aqueous medium that includes a colloidal stabilizer, optionally a surfactant, and previously-formed resol beads; reacting for a period of time and at a temperature sufficient to produce an aqueous dispersion of resol beads; and thereafter adding a remaining portion of the base and the aldehyde over a period of time, such as about 45 minutes. The previously-formed resol beads may be obtained, for example, as under-sized resol beads produced in a previous batch, or in the case of a continuous or semi-continuous process, as recycled beads obtained at any earlier point in the process.

In yet another aspect, the invention relates to processes for producing resol beads, the processes including a step of providing a portion of a phenol, a portion of an aldehyde, and a portion of a base as catalyst to a reaction mixture which is an agitated aqueous medium that includes a colloidal stabilizer, optionally a surfactant, and previously-formed resol beads; reacting for a period of time and at a temperature sufficient to produce an aqueous dispersion of resol beads, for example up to about two hours; thereafter a further portion of the phenol, a further portion of the aldehyde, and a further portion of a base as catalyst are added to the reaction mixture and reacted, for example for an additional two hours; and thereafter adding any remaining portion of the phenol, the aldehyde, and the base over a period of time and at a temperature sufficient to obtain the desired resol beads. The previously-formed resol beads may be obtained, for example, as under-sized resol beads produced in a previous batch, or in the case of a continuous or semi-continuous process, as recycled beads obtained at any earlier point in the process.

In yet another aspect, the processes of the invention may be carried out as already described, with a further portion of a base added after the reactants have begun reacting, or even when the reaction is otherwise substantially completed, the base being the same as or different from that already added to the reaction mixture as catalyst for the reaction.

It will be readily appreciated that any of the processes described herein may be modified as already described, such as by charging only a portion of a phenol, an aldehyde such as formaldehyde, and a base such as ammonia (for example as ammonium hydroxide or hexamethylene-tetramine) to an agitated aqueous medium containing a colloidal stabilizer and optionally a surfactant; charging a quantity of seed particles, and after reacting for a time, adding any remaining portion of the phenol, formaldehyde, or ammonia to the vessel in semi-batch mode during the further course of the reaction.

In further aspects, the processes by which the resol beads are formed may be continuous processes. Thus, in various aspects, continuous processes are envisaged according to any of the following.

A vessel containing an agitation device and operating at a temperature, for example, from about 75° C. to about 85° C., is provided with four continuous feed streams. In one stream, a mixture of phenol and water are fed to the vessel. The amount of phenol and water charged may comprise the total amount of these two compounds charged to the process. A second stream comprises a mixture of formaldehyde and ammonia. The amount of each corresponds to the amount of the phenol/water stream. The amount of formaldehyde and ammonia charged to the first reactor comprises from about 10% to 100% of the total amount of formaldehyde and ammonia charged to the process. The amount of ammonia and formaldehyde charged to the reactor may be independent of each other. A third feed stream comprises a colloidal agent such as soluble sodium carboxymethyl-cellulose, water, and optionally a surfactant such as sodium dodecylsulfate. A fourth feed stream comprises seed particles. The rate of the fourth stream may be such that the area rate (in $m^2$/sec) being charged to the reactor is proportional to the mass rate of phenol being charged (in kg/s). The ratio of these two quantities may be, for example, equal to or greater than 4 $m^2$ of seed surface area per kg of phenol charged.

The streams just described are mixed in the reactor to facilitate growth of the resol particles. The residence time in this first reactor may be, for example, from about 1 hour to about 3 hours. The product from this reactor may then be fed to a second reactor also held at a temperature from about 75° C. to about 85° C. Any remaining formaldehyde and ammonia not charged in the first reactor is charged to this second reactor in continuous fashion. The residence time of the second reactor may be, for example, from about 1 to about 3 hours.

The product slurry from the second reactor may then be pumped to a third reactor operating at 90° C. No feed streams need be fed to this vessel. The residence time may be, for example, from about 30 minutes to about 2 hours. The product stream from the third reactor may then be pumped to a fourth reactor operating at 25° C. Sufficient residence time is provided in this vessel to cool all of the feed stream to below about 40° C. The product from this vessel is fed to a solid-liquid separation device in order to recover the solids fraction. A section of the solid-liquid separation may be used for washing of the solids fraction and another section used to dry the solids by using a hot gas stream to remove adhering moisture.

In a further embodiment, the reactants are added to a batch reactor to form an aqueous reaction mixture which is agitated. Approximately four-fifths of the formaldehyde and all the ammonia may be retained to be added at a later point in semi-batch mode. The batch reactor with the contents may then be heated to a temperature from about 75° C. to about 85° C. After the batch reactor reaches the operating temperature, the remaining formaldehyde solution and ammonia may then be added to the vessel in semi-batch mode for example over a period of 45 minutes or more. The mixture may be held at this temperature for 5 hours or more. The mixture is thereafter heated to about 90° C. for about 45 minutes. The mixture is thereafter cooled to a temperature from about 10° C. to about 50° C. and the solids separated form the liquid by filtration.

Further variations of the processes described include those in which two or more of the feed streams in a continuous process are combined prior to being added to the reaction medium. The mixing or agitation may be accomplished, for example, by a rotating agitator inside the vessel, by flow induced by external or internal circulation, by co-current or countercurrent flow provided in or to the reaction vessels, or by flowing the reaction medium past stationary mixing devices (static mixers). The number of the vessels may be varied from one to several vessels to vary the nature of the mixing from fully backmixed to approaching plug flow, limited by the practicality and economy of providing multiple vessels. Further, the temperatures of one or multiple vessels may be varied to adjust reaction rates or the slurry discharge temperature.

Alternatively, a continuous process may be used in which resol beads above a minimum particle size are recovered from the reaction medium, and resol beads below a minimum particle size are retained in or recycled to the reaction medium.

Thus, in yet another aspect, the invention relates to processes for producing resol beads, the processes including:

a) reacting a phenol with an aldehyde in the presence of a base as catalyst, in an agitated aqueous medium that includes a colloidal stabilizer, and optionally a surfactant, for a period of time and at a temperature sufficient to produce an aqueous dispersion of resol beads;

b) recovering water-insoluble resol beads above a minimum particle size from the aqueous dispersion by any mean; and c) retaining or recycling beads below the minimum particle size in or to the aqueous dispersion of resol beads.

In yet another aspect, the invention relates to processes for producing resol beads, the processes including:

a) reacting a phenol with an aldehyde in the presence of a base as catalyst, in an agitated aqueous medium that includes a colloidal stabilizer, and optionally a surfactant, for a period of time and at a temperature sufficient to produce an aqueous dispersion of resol beads;

b) recovering water-insoluble resol beads above a minimum particle size from the aqueous dispersion by any mean; and c) retaining or recycling beads within a desired particle size range in or to the aqueous dispersion of resol beads.

Various configurations for solid-liquid separation from any of the above continuous processes, or recovery of beads above a minimum particle size, are possible, for example wherein the solids are fractionated according to size before being separated from the liquid of the reaction mixture. The fractionation may be accomplished by the use of devices integral to one of the vessels or in a separate device. Such size separation can be accomplished by various methods, such as by the use of a fixed physical aperture, such as a screen, slits or holes in a plate, whereby some solids pass and others are retained according to their ability to pass through the opening. Alternatively, gravity may be used, with or without countercurrent liquid flow, such as in a settling tank, or an elutriation leg. As a further alternative, centrifugal force may be used, such as that provided by a hydrocyclone or a centrifuge. The separation techniques just described may be repeated on the liquid slurry to create multiple streams of solids fractionated by size classes. The solids may or may not require washing and drying, according to the intended use of the beads.

Alternative methods of providing seed particles, in those instances where seed particles are provided, include those in which dry seeds are fed into the first vessel by the use of a mechanical metering device. Alternatively, the seeds may be fed as a slurry, with or without combination with all or part of one of the three liquid streams in the above description. The seeds may be recycled from the operating continuous process by one of the solid-liquid separation or fractionation processes described above, or the seeds may be generated in a separate process. Of course, if the size fractionation of solid particles is performed within the reaction vessel, the undersized particles may be retained and serve as seed particles, such that a continuous external feed stream of seeds is not required. In that event, the larger size particles are separated from the reaction mixture, and the smaller sizes retained to serve as seeds during the continuous process in which the reactants are continuously added.

In yet another aspect, the invention relates to processes along the lines already described, wherein the amount of methanol provided to the reaction mixture is limited.

Formaldehyde is typically provided as a 37% solution of para-formaldehyde in water and alcohol and is termed formalin. The alcohol is usually methanol and is present at a concentration average of from about 6-14% based on the formaldehyde sample. The methanol is a good solvent for the para-formaldehyde and acts to keep the para-formaldehyde from precipitating from solution. The formalin can thus be stored and processed at low temperatures (<23° C.) without para-formaldehyde precipitating from solution. However, we have found that the use of formalin solutions with much less methanol than is typically used suitably deliver formaldehyde to the reaction and that these solutions have advantages from the yield of larger particles point of view.

Thus, according to this aspect of the invention, a batch reaction may be conducted using water, a phenol such as phenol, a base such as ammonia as catalyst, a colloidal stabilizer such as carboxymethyl cellulose, an optional surfactant such as sodium-dodecyl sulfonate or the like, and formaldehyde in the form of a water/methanol solution. A quantity of previously-formed resol beads in the 150 to 300 um size range may suitably be added to the batch. The quantity of seeds added may be such that, for example, their total surface area is about $5.79 \, m^2$ per kg of phenol added to the batch. This will ensure that growth is the dominant mechanism of bead formation during the batch. To each batch, a quantity of methanol may also be added, but recalling that the amount of methanol be limited.

The following steps may then be used, for example to form a solid resin bead product:

a) The above reactants are added to a batch reactor to form an aqueous reaction mixture which is agitated. Approximately four fifths of the formaldehyde and all the ammonia may be retained to be added at a later point in semi-batch mode.

b) The batch reactor with the contents may then be heated to 75 to 85° C.

c) After the batch reactor reaches the operating temperature, the remaining formaldehyde solution and ammonia may then be added to the vessel in semi-batch mode for example over a period of 45 minutes or more.

d) The mixture is held at this temperature for at least 5 hours.

e) The mixture is thereafter heated to 90° C. for 45 minutes.

f) The mixture is thereafter cooled to between 10 and 50° C. and the solids separated form the liquid by filtration.

The amount of methanol contained in the formalin used may thus vary. In order to stabilize the formaldehyde in solution, a methanol concentration as low as 0.50% may be used, but it may be as high as 13% or more. At low levels of methanol, the solution can become unstable and the formaldehyde may precipitate from solution, particularly at lower temperatures (<30° C.), where the formaldehyde is less soluble in the water/methanol mixture. The methanol concentration may thus be present up to about 0.50% or more, or up to about 2% or more, or up to about 7%, or up to 13% or more, or from 0 to 5%, or from 0.50% up to 13%, in each case with respect to the concentration of methanol in the formalin solution.

The resol beads thus obtained may be used for a variety of purposes, for example by curing, carbonizing, and activating the material so that it can be used as an adsorbent. Both the thermal curing prior to carbonization and the activation following carbonization may be accomplished integral with the carbonization, if the proper activation processing parameters are present during carbonization, such as a gaseous atmosphere being selected that is suitable to accomplish all three of these objectives, as further described below, or else the curing, carbonization, and activation may be accomplished in two or more discrete steps. In those cases in which sticking of the particles to one another is acceptable, a discrete thermal curing step may be omitted entirely.

Obtaining the appropriate particle size of carbonized product may be important in obtaining the desired transport and adsorption properties, and in those cases, ideally, in which a high yield of larger sized resol bead particles is desired, for example greater than 425 um, very few fines are obtained or retained that are less than 150 um.

The heating of resol beads such as those already described can generate carbonized beads having substantially the same shape as the original object, but with a higher density. Thus, upon carbonization and activation, a resol bead will produce an activated carbon bead of substantially similar shape but typically with a smaller diameter than the starting resin.

During the curing and carbonization of the resol beads, stickiness and clumping of the particles can occur as the temperature is increased. This is an aggravation in experimental work, and represents a serious impediment to successful scale-up of a rotary kiln process. During one curing experiment with resin beads produced by a resol process, beads began to stick to each other and to the walls of the reactor as they were heated to 71° C. In subsequent experiments to further characterize this phenomenon in a rocking quartz reactor, it was observed that the beads stuck together in a single mass to the interior wall of the vessel. The beads remained like this until a temperature of 425-450° C. was reached, corresponding to the temperature region during carbonization where significant devolatilization occurs. At this point, the clumps broke free from the vessel wall. Subsequent agitation in the rotating vessel broke apart many of the clumps into their constituent beads, but clumps remained in the final product even after hours of further processing.

Although this sticking and clumping may not be a major problem in batch operations, it can be a serious problem in a scaled-up kiln. For efficiency, these processes typically run continuously. Low temperature solids are fed into one end of the kiln and progress first through a heat-up zone and subsequently into a high temperature section where the carbonization is completed. For example, the 70-450° C. region might be confined to a spatial zone in the reactor. If the beads stick to each other and to the reactor internals in this section, it could prove difficult to pass materials through the vessel. The reactor might even become totally plugged by the clumped resin mass, requiring a shut down and cleaning of the equipment.

Without wishing to be bound by any theory, it appears that this sticking or clumping results from the formation of bridges between the particles during heat-up, with the material forming the bridges coming from the particles themselves. Headspace GC analysis of uncured resol beads indicates the presence of residual phenol and formaldehyde. Thus, methods to reduce the amount of free phenol and formaldehyde to prevent this clumping from occurring may be performed in such a manner that the formation of bridges by curing reactions is prevented during the phenol and formaldehyde removal process.

Thus, in another aspect, the invention relates to controlled thermal processing conducted under conditions whereby the resin particles are in motion. This thermal processing is sufficient to create a sufficient amount of crosslinking such that the surface of the beads is less reactive, reducing sticking and clumping together of the beads during carbonization.

In one aspect, the resol beads may be agitated in a liquid such as water and heated to curing temperatures, for example of about 95° C., or at least about 85° C., or at least about 90° C., or from about 85° C. to about 95° C., or from about 88° C. to about 98° C. Typically, the liquid will be different from that in which the reaction was carried out, and indeed, we have found that the thermal curing according to the invention when carried out in the reaction medium results in beads that may tend to adhere to one another, indicating that the intended curing has not been satisfactorily accomplished.

In another aspect, the resol beads are agitated, as already described, in the presence of steam.

In yet another aspect, the resol beads are agitated and dried, as already described, in a vacuum dryer.

In yet a further aspect, the resol beads are agitated and heated, as already described, in an inert gas.

According to the foregoing, the resol beads are less prone to sticking and clumping or fusing together during further curing and carbonization, since they are treated or partially cured while in motion.

The particles are typically set into motion or agitation before the heating process is started. The vessel containing the particles can be set into motion such as by rotating or shaking. Alternatively, the vessel can be stationary and the particles may be set in motion by a moving internal mechanical device such as a stirrer, or by the action of a moving fluid, whether a liquid or a gas.

If the fluid is a gas, the process can be operated as a fluidized bed. Nitrogen, air, and steam are all satisfactory gases. Gases such as natural gas can be used provided that they do not significantly chemically degrade the resin. A variety of inert gases may suitable be used, the term inert being intended to describe a gas that may be provided that does not chemically degrade or otherwise alter or adversely affect the desired properties of the particles. Similarly liquid fluids should not significantly chemically damage the resin. Water is an example of a suitable liquid fluid. If the fluid is a liquid, the particles can be set into motion by stirring, shaking or otherwise moving the liquid, by boiling the liquid or by a combination of stirring, shaking or otherwise moving and boiling. The mechanical intensity of the movement is sufficient so long as sticking of the particles does not occur during the heating process.

The pressures at which the process may be carried out may vary widely depending on the fluid medium used. If no fluid is used, the pressure may be at vacuum, such that volatile reactants may be easily removed. If liquid fluids are used, the pressure can be above one atmosphere, if such conditions are necessary or helpful in order to attain the desired temperature. Otherwise, atmospheric pressure is generally satisfactory for gas or liquid fluids.

The process is generally operated from about ambient (20-25° C.) starting temperature to about 90-110° C. finishing temperature. Higher temperatures are possible, but curing of the resin accelerates as the temperature is increased further. Partial or extensive curing of the resin does not significantly affect the quality of the product produced in the carbonization reaction. Normally, the temperature is increased from ambient to the higher temperature at a rate that allows removal of unreacted phenol and formaldehyde from the moving particles without the particles sticking together. Satisfactory results have been obtained fluidizing particles in nitrogen and increasing the temperature from ambient to 105° C. in 80 minutes and holding at 105° C. for 60 minutes. Thirty minutes in stirred refluxing water also provides satisfactory results. When liquid water is the fluid, the volume of water is not critical provided efficient movement is achieved. Particles treated with liquid fluids may require a subsequent washing step to completely remove the dissolved phenol and formaldehyde.

The resol beads produced according to the invention may be used in a variety of ways, for example by curing, carbonizing, and activating to obtain activated carbon beads.

The resol beads can be cured such as already described, the amount of curing obtained varying depending on the temperature of the treatment, the medium in which the beads are cured, and the duration of the treatment. The precipitated resol beads according to the invention have some degree of branching and partial crosslinking. Heating these precipitated resol beads at low temperatures, for example from about 95° C. to about 115° C., typically induces a partial cure. However, rapid heating of the phenol formaldehyde resol beads from ambient temperature through the partial curing region just described, for example at 95-115° C. in less than 20 minutes in an inert gas, may cause the beads to stick together to form a fused mass with the beads joined where they touch. This sticking together may be acceptable or even desirable in those cases in which discrete beads are not desired, such as in forming a resol monolith, but is a distinct drawback where sphericity and a relatively uniform particle size are desired.

As already described, we have found that a partial cure may increase the glass transition temperature from less than about 50° C. to greater than about 90° C. If the partial cure is performed under conditions of sufficient agitation to keep the particles moving with respect to each other, the bead sticking can be eliminated. Thus, in one aspect, the present invention relates to thermal processing of resol beads such that the beads are in motion, in order to prevent subsequent sticking of the beads during any further processing.

The rate of heating and the time at the partial curing temperature may vary depending on the properties of the starting resol and the heating medium used. The beads can be totally cured and carbonized without the separate partial curing step already described, but, since the beads will probably be stuck together, they may need to be mechanically separated from a mass that may be difficult to break up. Complete curing of the material may be accomplished, for example, in the temperature region of about 120° C. to about 300° C. with the maximum rate typically occurring at about 250° C. During such a cure the resin becomes highly crosslinked, and water and some unreacted monomers are typically evolved.

During carbonization, cross-linked resol beads decompose to form oxidation products different from the starting materials, leaving a product with an increased carbon content.

Carbonization is believed to begin as the cured resin is heated above about 300° C. Most of the weight loss (typically between 40 and 50 weight percent) typically occurs in the temperature range from about 300° C. to about 600° C. Water, carbon monoxide, carbon dioxide, methane, phenol, cresols and methylene bisphenols are typically the most abundant species evolved. During the carbonization process, the beads also shrink, but retain their spherical shape. Minimum density is typically attained at about 550° C. As the carbonization temperature is increased beyond 600° C., very little weight loss occurs, but the particles continue to shrink. This continued reduction in size without significant weight loss results in an increase in density as the temperature is increased further. Reduction in particle diameters typically ranges from about 15 to about 50%, or from 15 to 30%, and higher reduction results from higher end carbonization temperatures. Generally carbonization temperatures are from about 800° C. to about 1,000° C. The final carbonized product is also termed char.

Microporosity (pores having diameter of 20 angstroms or less) is generally developed at temperatures above 450° C. However, carbonization by itself generally produces a material in which the microporosity is not totally accessible, and the material is then further activated to produce accessible porosity. If an activated product is desired, the maximum carbonization temperature is normally close to the activation temperature that will be used. Carbonization temperatures above 1,000° C. are possible if a high surface area material is not the ultimate goal. Excessive carbonization temperature causes further graphitization of the material, the process where amorphous carbon begins to convert into a bulk graphite phase, causing the density of the particles to increase.

Carbonization reactions are generally performed in a non-oxidizing atmosphere, to prevent excessive degradation of the material. Common atmospheres include nitrogen and oxygen-depleted combustion gases. Thus the atmosphere can include water, carbon oxides, and hydrocarbons, and the combusted gas from the fuel used to provide the heat for the carbonization reaction may provide a suitable atmosphere for the carbonization. The carbonization can be performed in a steam and/or carbon dioxide rich atmosphere, in which case the carbonization may be performed in the same equipment and in the same gaseous atmosphere as the subsequent activation. Similarly, the carbonization step can advantageously be combined with the thermal curing step and run in the same equipment and in the same gaseous atmosphere. If desired, a preliminary partial cure often can also be performed in the same equipment as the cure and carbonization, provided there is sufficient agitation. Generally the beads are moving during curing and carbonization, but this is not a requirement, so long as some clumping or sticking is acceptable. Fused carbonized product beads formed under static conditions can be broken up to provide free flowing beads if necessary. However, maintaining the beads in motion provides better heat transfer and gives a more uniform product. Rotary kilns and fluidized beds are suitable reactors for the curing and carbonization reactions.

The term "activation" as used herein is intended to encompass any treatment which serves to increase the accessible surface area of a carbonized material, and typically involves treating the carbonized material with steam, carbon dioxide, or mixtures thereof, in an endothermic reaction that removes a portion of the carbon. The activation process makes more of the inherent micropore system of the carbonized material accessible. Carbon monoxide is a primary product when the char is reacted with carbon dioxide, and carbon monoxide and hydrogen are among the gases produced when water reacts with the char. Combustion of the product gases can be used to provide heat to the process.

This endothermic activation reaction is typically performed at elevated temperature, the rate of activation increasing with the temperature. Rates are significant in the range from about 800 to about 1,000° C. Excessively high activation temperatures (typically above about 900° C.) can produce a non-uniformly activated product that is over-activated on the outside and under-activated on the inside. This results from the rate of reaction of the activating gas being greater than the rate of diffusion of the gas into the particle. The activation rate also increases with the partial pressure of the activating gas. It is generally preferable to minimize the presence of molecular oxygen during the activation process unless a non-uniform product is desired. If molecular oxygen is present, an exothermic oxidation occurs causing local heating, and reaction will continue to occur in the region of the hot spot resulting in a non-uniform product. Indeed, the endothermic nature of the activation assists in controlling the uniformity of the product since the reaction produces local cold spots and further reaction occurs in a different, higher temperature, region.

If sphericity and controlled particle size are desired, the beads will be kept in motion during activation, but this is not a requirement for the reaction. If the beads are kept in motion, both mass and heat transfer are facilitated, and a more uniform product may be produced. Rotary kilns and fluidized beds are suitable reactors. Combustion gases can be used to provide both the heat and activating gas to the reactor. For process convenience, the carbonization process can be combined with the activation process in the same reactor with the same gas composition, that is, in the same gaseous atmosphere.

The activated carbon product from the activation process maintains its spherical shape, and is normally essentially of the same or similar size as the starting char. Excessively small beads may be totally consumed during activation, especially if the activation is performed at elevated temperatures, with the smaller beads being activated at elevated rates. This can shift the particle size distribution towards a larger mean size than the starting char.

Activation produces a bead that can be highly porous and have a very high surface area depending on the degree of activation. Thus the activated product will have lower density than the char it came from. The surface area per unit weight, the pore volume and the percent pore volume due to micropores can be determined by the method developed by Brunauer, Emmett and Teller (commonly termed the BET method). Activation of a 300-350 micron char with few accessible pores (surface area less than 1 $m^2/g$) at 900° C. in 50 volume % steam-50 volume % nitrogen for two hours in a fluidized bed typically produces an activated carbon with a BET surface area in excess of 800 $m^2/g$. Activated carbon beads produced by the processes of the invention can be highly microporous and also have high surface areas. Phenol-formaldehyde resol beads produced in the absence of a pore forming component when carbonized and activated to surface areas up to about 1,500 $m^2/g$ generally have 95% or greater of the pore volume due to micropores. Further activation to higher surface area reduces the percentage of micropores, and a material with BET surface area of 1,800 $m^2/g$ can have about 90 percent of its pores in the micropore region. Incorporation of a pore-forming component in the resol bead can yield an activated carbon bead possessing mesopores (20 to 500 angstroms in diameter) in addition to the micropore structure. Suitable pore-forming agents include ethylene glycol, 1,4-butanediol, diethylene glycol, triethylene glycol, gammabutyrolactone, propylene carbonate, dimethylformamide, N-methyl-2-pyrrolidinone, and nonoethenol amine. The presence of mesopores may be advantageous in instances where mass transfer of species in and out of the activated beads needs to be augmented.

The particle size may be measured with a laser diffraction type particle size distribution meter, or optical microscopy methods, as already described. Alternatively, the particle size can be correlated by a percentage of particles screened through a mesh. For example, the beads can be poured onto a U.S. standard sieve number 30, and the material passing through the U.S. number 30 sieve allowed to fall onto a U.S. standard sieve number 40 sieve. The material retained on the U.S. standard sieve number 40 sieve would then have particle diameters from 420 to 590 microns.

The resulting activated carbon beads may be characterized in a variety of ways, such as by pore size; surface area; absorptive capacity; average, median, or mean particle size. These properties will depend in part on the degree of activation and the pore structure of the starting resin, as well as whether any additional pore-forming material has been added, such as already described. The surface area per unit weight, the pore volume and the percent pore volume due to micropores can be determined by the method developed by Brunauer, Emmett and Teller (commonly termed the BET method). The particle size may be measured with a laser diffraction type particle size distribution meter, or optical microscopy methods. Alternatively, the particle size can be correlated by a percentage of particles screened through a mesh. Apparent density may be determined by the ASTM method D 2854-96 entitled "Standard Test Method for Apparent Density of Activated Carbon."

Some typical values for these characteristics are set out below, the information given being typical of activated carbon beads made from resol beads according to the invention formed without the addition of significant amounts of additional pore forming material.

The BET surface areas of the activated carbon beads of the invention may vary within a relatively wide range, for example from about 500 m2/g to about 3,000 m2/g, or from 600 m2/g to 2,600 m2/g, or from 650 m2/g to 2,500 m2/g. Similarly, the pore volume of the activated carbon beads of the invention may vary within a relatively wide range, for example from about 0.2 to about 1.1 cc/g, or from 0.25 to 0.99 cc/g, or from 0.30 cc/g to 0.80 cc/g. Further, for example, from about 85% to about 99% of the pores may have diameters below 20 angstroms, or from about 80% to 99%, or from 90% to 97%. The apparent density of the activated carbon beads of the invention may also vary within a relatively wide range, for example from about 0.20 g/cc to about 0.95 g/cc, or from 0.25 g/cc to about 0.90 g/cc, or from 0.30 cc/g to 0.80 cc/g.

Thus, resol beads of the invention carbonized and activated to a relatively low degree might have a BET surface area from about 500 $m^2/g$ to about 1,500 m2/g, a pore volume from about 0.30 cc/g to 0.50 cc/g, and with about 99% to about 95% of the pores having diameters below 20 angstroms. The apparent density might be from 0.90 g/cc to about 0.60 g/cc. However, even lower degrees of activation might well be achieved.

Material that has been activated to a relatively high degree might, for example, have a BET surface area from about 1,500 m2/g to about 3,000 $m^2/g$, a pore volume from about 0.7 cc/g to 1.0 cc/g or more, with from about 85% to about 99% of the pores having diameters below 20 angstroms. The apparent density might be from about 0.25 to about 0.60 g/cc. Relatively high degrees of activation are possible and have been achieved, for example about 2,600 $m^2/g$.

Typically, activated material will have, for example, a BET surface area from about 750 m2/g to about 1,500 m2/g, corresponding to a pore volume from 0.30 cc/g to 0.70 cc/g, and with 95% to 99% of its pore volume from pores of less than 20 angstroms. The apparent density would be from about 0.50 g/cc to about 0.75 g/cc.

We have found that the mean particle size of activated particles is typically about 30% less than that of the resol beads from which they are formed. Thus, a resol bead having a mean particle size of 422 microns provides an activated product with a mean particle size of 295 microns, a BET surface area of 1260 m2/g, a pore volume of 0.59 cc/g, 97% of its pore volume from pores less than 20 angstroms and density=0.63 g/cc after carbonization and activation in 50% steam/50% nitrogen at 900° C. for 2 hours.

The inventions may be further illustrated by the following examples of preferred embodiments, although it will be understood that these examples are included merely for purposes of illustration and are not intended to limit the scope of the invention unless otherwise specifically indicated.

EXAMPLES

Test Methods

Test Method to Determine Particle Size (PS) and Particle Size Distribution (PSD) of Phenolic Resol Beads: Unless otherwise indicated, particle size analysis of beads was performed using a Wild Photomakroskop M400, to acquire images of beads, while imaging processing and analysis was performed using Visilog v 5.01 (Noesis) software. The beads were dispersed on glass slides and images were captured at magnifications ranging from 10× to 100×, depending on particle size range. Each magnification was calibrated using micrometer standards. Images were recorded in bitmap format and processed using Visilog software to measure particle diameters. The number of images processed ranged from 20 to 40 and depended on particle size and magnification with the aim of collecting over a few thousand particles in order to assure that a statistically significant number of particles were captured and measured. JMP Statistical analysis software was subsequently used to calculate particle size distribution and particle statistics such as mean and standard deviation.

Pore volume and pore size distributions were measured on a Micromeritics ASAP 2000 physisorption apparatus using $N_2$ at 77K. The adsorption isotherm was measured from a relative pressure of $10^{-3}$ to 0.995. If greater detail was needed for the low end of the pore size distribution, the adsorption isotherm was also measured for $CO_2$ at 0° C. from a relative pressure of $10^{-4}$ to 0.03. The total pore volume for the sample was calculated from the total gas adsorption at a relative pressure of 0.9. The pore size distribution was calculated from the adsorption isotherm according to the slit pore geometry model of Horvath-Kawazoe. See Webb, P. A., Orr, C; "Methods in Fine Particle Technology", Micromeritics Corp, 1997, p. 73.

Example 1

To a 500-mL 3-neck flask equipped with a crescent-shaped mechanical stir paddle, thermowell, heating mantel, and reflux condenser were added phenol in water (54-g of 88%; 0.506-mole), stabilized formaldehyde solution (97-g of 37%; 1.196-mole), concentrated ammonium hydroxide (4.3 g; 0.070-mole), water (25-mL), sodium dodecylsulfate (0.122-g), carboxymethyl cellulose sodium (0.500-g; degree of substitution=0.9; average MW 250,000). The resulting mixture was mixed well and stirred at 50-rpm, and 25-g of previously-formed beads (made using the same process) in the size range of 150-300 µm were added. The mixture was heated at 75° C. for 4,5-h, and at 90° for 45-min. The mixture was cooled to 32°, and allowed to settle, and the mother liquor was decanted. The residue washed three times with 150-mL portions of water (decanted the first two washes) and filtered. The product was dried overnight at room temperature in a fluidized-bed dryer in a stream of nitrogen passed through the bottom of the bed, and a sample was analyzed for particle size distribution. The product was sieved into four size groups as listed in Table 1. The numerical particle size distribution is given Table 2.

TABLE 1

Particle size distribution by weight.

| Example | >425 µm (g) | >300 <425 µm (g) | >150 <300 µm (g) | <150 µm (g) | total (g) |
|---|---|---|---|---|---|
| 1 | 3 | 39 | 23 | 3 | 68 |
| 2 | 0 | 11 | 25 | 8 | 44 |

Example 2

The procedure described in Example 1 was followed except that no previously-formed beads were added to the mixture. The weights of the sieved fractions are given in Table 1, and the numerical particle size distribution is given in Table 2.

TABLE 2

Numerical particle size distribution.

| % smaller | | Example 1 size (µm) | Example 2 size (µm) |
|---|---|---|---|
| 100 | maximum | 855 | 811 |
| 99.5 | | 651 | 524 |
| 97.5 | | 439 | 350 |
| 90 | | 356 | 231 |
| 75 | quartile | 276 | 154 |
| 50 | median | 142 | 87 |
| 25 | quartile | 76 | 39 |
| 10 | | 35 | 23 |
| 2.5 | minimum | 18 | 18 |
| 0 | | 18 | 18 |

Example 3

A 500-mL 3-neck flask equipped with a crescent-shaped mechanical stir paddle, thermowell, heating mantel, and reflux condenser was charged with phenol (54-g of 88%; 0.506-mole), stabilized formaldehyde solution (97-g of 37%; 1.196-mole), concentrated ammonium hydroxide (4.3 g; 0.070-mole), water (25-mL), sodium dodecylsulfate (0.122-g), carboxymethyl cellulose sodium (0.500-g; degree of substitution=0.9; and average MW 250,000). The resulting mixture was mixed well and stirred at 50-rpm and heated at 75° C. for 4,5-h, and at 90° C. for 45-min. The mixture was cooled to below 32° C., let settle, and the mother liquor was decanted. The residue washed three times with 150-mL portions of water (decanted the first two washes) and filtered. The product was dried overnight in a fluidized-bed dryer in a flow of nitrogen. The product was sieved into four size groups comprised of beads having a diameter of >425-µm; <425-µm but >300-µm; <300-µm but >150-µm; and <150-µm.

Example 4

The procedure of Example 3 was followed, except that the beads having a size (diameter) of <300-μm produced in Example 3 were charged to the mixture before heating to 75° C.

Example 5

The procedure of Example 3 was followed, except that the beads having a size (diameter) of <300-μm produced in Example 4 were charged to the mixture before heating to 75° C.

Example 6

The procedure of Example 3 was followed, except that the beads having a size (diameter) of <300-μm produced in Example 5 were charged to the mixture before heating to 75° C.

Example 7

The procedure of Example 3 was followed, except that the beads having a size (diameter) of <300-μm produced in Example 6 were charged to the mixture before heating to 75° C.

The results of Examples 3-7 are summarized in Table 3. Note that the yield of product in the size range 300-425 μm increased by the addition of the smaller beads, and that the total yield of 300-425 μm beads approaches the total yield of all bead sizes. The cumulative total weight listed in Table 3 represents the total weight of product in all size ranges produced in successive batches to that point. The total %-yield of beads of size range 300-425 μm represents the amount of beads of this size range produced in the example added to the amount produced in the previous examples. The total %-yield is the total weight of beads of all size ranges produced in the example and previous examples divided by the total weight of phenol used in the example and previous examples. The total weight of product from each example is similar to the sum of the recycled beads and the total weight of product from example 3. The amount of product in the 300-425 μm size range produced in each reaction is always greater than the amount of recycled beads, indicating that the 150-300 μm beads grew to the 300-425 size range during the reaction.

Examples 8-12

Five reactions were carried out under similar conditions. The only difference was that the amount of seeds in terms of surface area per unit mass of phenol charged to each experiment was varied. Each experiment had the same charge details in terms of the amount of formaldehyde (37%), phenol (88%), ethanol, Na—CMC (2.76 g), SDS (0.66 g), water and ammonia. The formaldehyde solution used contained 7.5% methanol to inhibit formaldehyde precipitation. This was equivalent to 40.21 grams of methanol as shown in Table 4. Each experiment was conducted in semi-batch mode, that is, all of the reactants were charged to the reactor except for 436.15 grams of formaldehyde and all (23.77 grams) of the ammonia were pumped into the reactor at a rate of 6 mls/min starting at a time when the reactor temperature reached the target operating temperature. Each experiment lasted for a period of 5 hours after 85° C. was reached. The batch was subsequently heated to 90° C. for 45 minutes and then cooled to room temperature and subjected to a series of reslurries where the mother liquor was replaced by fresh water four times. The difference between the experiments was the quantity of seeds added to the vessel in each experiment. Table 4a shows the quantity of seeds charged both in terms of their mass, the particle size range and the surface area charged per unit mass of phenol charged to the vessel.

The product particle size distributions that resulted from the batches are shown in Table 4b. It can be seen that the batches that had a surface area per unit mass of phenol of 1.45 $m^2$/kg, yielded a large fraction of particles that were in the lowest size class (0-150 μm). This fine material is undesirable in thermal processing, as it will yield a very small product size and has dusting issues. In addition to producing fines, we found that a small seed surface area ratio in a batch can yield a large number of agglomerates in some experiments. The effectiveness of using a small amount of seeds is also reflected in the span value calculated from each distribution. For experiment 8, it had a value of 332 μm and for experiment 12, it had a value of 279 μm while experiments 9, 10 and 11 it had values less than 228 μm. The $d_{90}$ value of example 8 is comparable to that of example 9 but the d10 value is much lower than either of experiments 9, 10 or 11. The d10 and the d90 was the lowest of all five experiments in experiment 12 which had the lowest seed surface area 1.45 $m^2$/kg phenol.

Tables 4a and 4b—Recycle beads (seeds) in terms of their mass, the particle size range and the surface area charged per unit mass of phenol charged to the vessel.

TABLE 3

Recycle of beads of size <300 μm produced in a batch to the successive batch

| Example | wt of recycled beads (<300-μm) (g) | wt product (total) (g) | >425 μm (g) | >300 <425 μm (g) | >150 <300 μm (g) | <150 μm (g) | cumulative total wt | total % yield of beads 300-425 μm | total % yield |
|---|---|---|---|---|---|---|---|---|---|
| 3 |  | 51.5 | 7.5 | 13.5 | 26.1 | 3.3 | 50 | 28 | 106 |
| 4 | 29.4 | 83.8 | 1.2 | 39 | 39.6 | 3.7 | 105 | 55 | 110 |
| 5 | 43.3 | 96.3 | 0.3 | 47.6 | 46.9 | 1.4 | 157 | 70 | 110 |
| 6 | 48.3 | 101.3 | 0.1 | 63.6 | 37.4 | 0.1 | 210 | 86 | 111 |
| 7 | 37.4 | 76.6 | 9.7 | 59.0 | 7.8 | 0.0 | 249 | 94 | 105 | a) cumulative total wt is weight of all product from successive batches less the recycled beads
b) total % yield of beads is the sum of the weight of beads 300-425 μm from successive batches divided by the total amount of phenol from successive batches
c) total % yield is the sum of the weight of all bead sizes from successive batches divided by the amount of phenol from successive batches TABLE 4a

| | Operating conditions | | Quantities added to reactor | | | | | | | | | Seed size range [um] | Surface Area [m2/kg phenol] | Quantities added in semi-batch | | |
|---|---|---|---|---|---|---|---|---|---|---|---|---|---|---|---|---|
| Ex. | Temp. [° C.] | Impeller speed [RPM] | Phenol [gr] | Formal-dehyde [gr] | Ammo-nia [gr] | Water [gr] | Na-CMC [gr] | SDS [gr] | Ethanol [gr] | Methanol [gr] | Seeds [gr] | | | Formal-dehyde [gr] | Ammo-nia [gr] | Rate [mls/min] |
| 8 | 85 | 50 | 298.18 | 536.15 | 23.77 | 138 | 2.76 | 0.66 | 30 | 40.21 | 40 | 150-300 | 1.45 | 436.15 | 23.77 | 6 ml/min |
| 9 | 85 | 50 | 298.18 | 536.15 | 23.77 | 138 | 2.76 | 0.66 | 30 | 40.21 | 80 | 150-300 | 2.90 | 436.15 | 23.77 | 6 ml/min |
| 10 | 85 | 50 | 298.18 | 536.15 | 23.77 | 138 | 2.76 | 0.66 | 30 | 40.21 | 120 | 150-300 | 4.35 | 436.15 | 23.77 | 6 ml/min |
| 11 | 85 | 50 | 298.18 | 536.15 | 23.77 | 138 | 2.76 | 0.66 | 30 | 40.21 | 80 | 150-300 | 2.90 | 436.15 | 23.77 | 6 ml/min |
| 12 | 85 | 60 | 298.18 | 536.15 | 23.77 | 218 | 2.76 | 0.66 | 0 | 40.21 | 40 | 150-300 | 1.45 | 436.15 | 23.77 | 6 ml/min |

TABLE 4b

| | Particle Size Distribution [grams] Size Class Median Size | | | | | | Differential Particle Size Distribution [%] Size Class Median Size | | | | | | Yield [%] | $d_{10}$ [um] | $d_{90}$ [um] | Span [um] |
|---|---|---|---|---|---|---|---|---|---|---|---|---|---|---|---|---|
| Example | 753 | 654 | 527 | 373 | 247 | 119 | 753 | 654 | 527 | 373 | 247 | 119 | | | | |
| 8 | 3.2 | 0.9 | 45.7 | 199.4 | 15.2 | 51.9 | 1.01 | 0.28 | 14.45 | 63.04 | 4.81 | 16.41 | 93.45 | 57 | 389 | 332 |
| 9 | 0.9 | 6.5 | 32.1 | 182.6 | 110.9 | 2.1 | 0.27 | 1.94 | 9.58 | 54.49 | 33.09 | 0.63 | 90.31 | 134 | 362 | 228 |
| 10 | 0.7 | 0.2 | 20.9 | 226.2 | 136.4 | 5.8 | 0.18 | 0.05 | 5.36 | 57.97 | 34.96 | 1.49 | 93.99 | 128 | 331 | 203 |
| 11 | 0.3 | 4.0 | 10.3 | 93.1 | 73.8 | 2.5 | 0.16 | 2.17 | 5.60 | 50.60 | 40.11 | 1.36 | 89.82 | 124 | 335 | 210 |
| 12 | 0.6 | 1.3 | 14.2 | 64.3 | 152.5 | 84.2 | 0.19 | 0.41 | 4.48 | 20.28 | 48.09 | 26.55 | 97.70 | 35 | 314 | 279 |

Example 13

5 Gallon Batch

To a 5-gallon jacketed reactor equipped with anchor impeller and reflux condenser were added phenol (4860-g of 88%; 45.5-mole), stabilized formaldehyde solution (8740-g of 37%; 107.7-mole), ammonium hydroxide (390-g; 6.35-mole), water (2800-mL), sodium dodecylsulfate (11-g), carboxymethyl cellulose sodium (45-g, degree of substitution=0.9). The resulting mixture was mixed well and stirred at 25-rpm, and 1200-g of beads in the size range of 150-300 μm was added. The mixture was heated at 75° C. for 4 hrs, and for 45 min at 88° C. The mixture was cooled to 32°, let settle, and the mother liquor was decanted. The residue was washed three times with 12 liter portions of water (decanted the first two washes) and filtered. The product was dried overnight in a fluidized-bed dryer, and a sample was analyzed for particle size distribution.

Example 14

5-Gallon Semi-Continuous

The procedure of Example 8 was followed except that formaldehyde and ammonia solution were fed continuously over two hours, at 75° C., to the reaction mixture containing phenol, carboxymethyl cellulose, water and sodium dodecyl sulfate. After two hours feeding time, the reaction mixture was held at 75° C. for an additional two hours, and at 88° C. for 45 minutes. There were no significant differences from Example 13 in product yield or bead size distribution.

Example 15

A 1-L oil-jacketed resin kettle with a rounded bottom equipped with a stainless-steel, anchor-shaped stirring paddle, reflux condenser, thermowell, and formaldehyde feed line was charged with liquefied phenol (162-g; 1.517-mole), 2% Guar gum solution in water (77-g), sodium dodecyl sulfate (345-mg; 1.2-mmole), and uncured previously-formed resin beads having a diameter from 120-250 μm (57-g). The resulting mixture was heated to 80° C., and a solution of concentrated ammonium hydroxide (14.1-g; 0.241-mole) dissolved in 37% aqueous formaldehyde (291-g; 3.589-mole) stabilized with methanol (12%) was added at a rate of 2.7 mL/min. The temperature rose to 85° C. during addition and was held at 85° for 4-h, and heated at 90° C. for 45-min. After cooling to 30° C., the solid product did not settle. The mixture was diluted with 300-mL of distilled water, allowed to settle, and the water layer was decanted. This procedure was repeated three times. The solid product was isolated by vacuum filtration and dried in a fluidized dryer. The yield of beads was 223-g. The product contained a large amount of small beads that were stuck to larger ones giving them a rough surface. We attribute this to the guar gum used as a colloidal stabilizer.

Example 16

A 1-L oil-jacketed resin kettle with a rounded bottom equipped with a stainless-steel, anchor-shaped stirring paddle, reflux condenser, thermowell, and formaldehyde feed line was charged with liquefied phenol (162-g; 1.517-mole), 2% carboxymethyl cellulose sodium (degree of substitution=0.9; and average MW 250,000) solution in water (76-g), and uncured previously-formed resin beads having a diameter from 120-250 μm (57-g). The resulting mixture was heated to 80° C., and a solution of concentrated ammonium hydroxide (14.3-g; 0.244-mole) dissolved in 37% aqueous formaldehyde (291-g; 3.589-mole) stabilized with methanol (12%) was added at a rate of 2.7 mL/min. The temperature rose to 85° C. during addition and was held at 85° for 4-h, and heated at 90° C. for 45-min. After cooling to 35° C., the mixture was allowed to settle and the mother liquor was decanted. The product washed 3-times with 300-mL portions of water and was isolated by vacuum filtration and dried in a fluidized dryer.

uct use. In addition, the yield from the batch experiment (example 17) was 77.14% while the yield from the semi-batch experiment (example 18) was 83.43%. Thus, operating in semi-batch mode has advantages from the quantity of product made as well as the quality of the particle size distribution.

TABLE 5

Experimental description and results from experiments with batch or semi-batch addition of formaldehyde and ammonia.

| | Operating conditions | | Quantities added to reactor | | | | | | | | | | | Quantities added in semi-batch | | |
|---|---|---|---|---|---|---|---|---|---|---|---|---|---|---|---|---|
| Ex. | Temp. [° C.] | Impeller speed [RPM] | Phenol [gr] | Formal-dehyde [gr] | Ammo-nia [gr] | Water [gr] | Na-CMC [gr] | SDS [gr] | Ethanol [gr] | Methanol [gr] | Seeds [gr] | Seed size range [um] | Surface Area [m2/kg phenol] | Formal-dehyde [gr] | Ammo-nia [gr] | Rate [mls/min] |
| 17 | 85 | 250 | 298.18 | 536.15 | 23.77 | 138 | 2.76 | 0.66 | 30 | 40.21 | 80 | 177-250 | 5.78 | | | |
| 18 | 85 | 230 | 298.18 | 536.15 | 23.77 | 138 | 2.76 | 0.66 | 30 | 80.42 | 80 | 177-250 | 5.78 | 436.15 | 23.77 | 6 ml/min |

The yield of beads was 202-g. The product was sieved through screens to separate according to size: 6,5-g>600-μm; 62.4-g>425-μm (<600-μm); 98.7-g>300-μm; 29.4-g>250-μm; and 24.1-g>150-μm.

Examples 17-18

Semi-Batch Addition of Formaldehyde and Ammonia to Reactor

In experiments 17 and 18, a 1.2 liter jacketed reactor with adequate agitation to suspend the phenolic resol beads was used. The material quantities shown in Table 5 were charged to each experiment. In the case of example 17, all of the reactants were added to the reactor while in example 18, only a portion of the formaldehyde (100 grams) and none of the ammonia was added to the reactor. These were instead added in semi-batch mode at a rate of 6 mls/min once the reactor temperature had reached the operating temperature (85° C.).

30 grams of ethanol were added to each experiment. The 40.21 grams in experiment 17 is contained in the formaldehyde solution. An additional 40 grams of methanol was added to the experiment in example 18.

The materials in the reactor were heated to the reaction temperature (85° C.) and held at this temperature for 5 hours. In the case of the semi-batch experiments, the formaldehyde/ammonia mixture was pumped into the reactor at a rate of 6 mls/min. It took approximately 1 hour and 15 minutes to pump the formaldehyde/ammonia mixture into the reactor.

After the reaction had been completed, the vessel contents were heated to 90° C. or higher and held for a minimum of 40 minutes and then cooled to near room temperature. The slurry was reslurried in water 4 times to wash the particles and displace the mother liquor. The slurry was then filtered and dried with air. A forward light scattering instrument was used to determine the particle size distribution of the product. The results of the analysis are shown in Table 5.

The distribution produced by the semi-batch method yields a narrower distribution containing fewer fine particles (<250 um) and fewer large particles (>350 um). This is reflected in the span values for both distributions. The span calculated for example 17 (batch case) was 125 μm and for example 18 (semi-batch case), it was 93 μm. This type of distribution is advantageous for downstream processing and for final prod- Examples 19-22

Addition of Batch in Parts

Of the experiments listed in table 6 (examples 19 to 22), three are conducted in semi-batch mode (examples 19, 20, 21) while the other experiment (example 22) is conducted in batch mode.

For each experiment, the quantity of seeds added in relation to the amount of phenol added remained constant. The type of seeds added to each experiment was also the same, being in the 150 to 300 micron size range. Complete charge details are shown in Table 6. Ethanol was not added to the experiment in example 22. Formaldehyde containing 7.5% methanol was used in each experiment.

Experiments 19 and 21 were conducted in the same fashion, a 1.2 liter jacketed reactor with adequate agitation to suspend the phenolic resol beads was used. The material quantities shown in Table 6 were charged to each experiment. Only a portion of the formaldehyde (100 grams) and none of the ammonia were added to the reactor. These were instead added in semi-batch mode at a rate of 6 mls/min once the reactor temperature had reached the operating temperature (85° C.).

The materials in the reactor were heated to the reaction temperature (85° C.) and held at this temperature for 5 hours. The formaldehyde/ammonia mixture was pumped into the reactor at a rate of 6 mls/min. It took approximately 1 hour and 15 minutes to pump the formaldehyde/ammonia mixture into the reactor.

After the reaction had been completed, the vessel contents were heated to 90° C. or higher and held for a minimum of 40 minutes and then cooled to near room temperature. The slurry was allowed to settle and the liquid layer was decanted. Fresh water was added to wash the solids. This washing procedure was repeated a further two times. The slurry was finally filtered and dried in air. A number of sieves were used to separate the dried particles into a number of fractions. The results of the analysis are shown in Table 6.

Experiment 20 was conducted in two stages. Each stage uses half of each ingredient as is listed for experiment 20 in Table 6. The first stage was conducted in the same way as were experiments 19 and 21. The experiment was continued for 3 hours instead of 5 hours (as in experiments 19 and 21). After 3 hours, the batch was cooled to 40° C. and 324.21 grams were removed from the vessel. The remaining contents were re-heated to 85° C. and the second part of the experiment was started. As in the first part, all of the ingredients except for 436.15 grams of formaldehyde and 23.77 grams of ammonia were charged to the reactor. The remaining formaldehyde and ammonia were charged at a rate of 6 mls/min. The second part of the experiment was continued for 3 hours before being heated to 90° C. for at least 40 minutes. The batch was then cooled to 40° C. The slurry was allowed to settle and the liquid conducted in 2 stages (example 20) had the widest span, due the presence of more large particles in the distribution but had far fewer fines than the batch experiment, having a $d_{10}$ size of 115 microns.

In addition, example 22 showed the lowest yield value of all four experiments at 55% compared to the next closest value of 90% for example 21.

TABLE 6

Operating conditions and particle size distribution results for experiments done in parts

| | Operating conditions | | Quantities added to reactor | | | | | | | | | Seed | Surface | Quantities added in semi-batch | | |
|---|---|---|---|---|---|---|---|---|---|---|---|---|---|---|---|---|
| Ex. | Temp. [° C.] | Impeller speed [RPM] | Phenol [gr] | Formaldehyde [gr] | Ammonia [gr] | Water [gr] | Na-CMC [gr] | SDS [gr] | Ethanol [gr] | Methanol [gr] | Seeds [gr] | size range [um] | Area [m2/kg phenol] | Formaldehyde [gr] | Ammonia [gr] | Rate [mls/min] |
| 19 | 85 | 250 | 298.18 | 536.15 | 23.77 | 138 | 2.76 | 0.66 | 30 | 40.21 | 80 | 150-300 | 2.900806 | 436.15 | 23.77 | 6 |
| 20 | 85 | 250-350 | 596.36 | 1072.3 | 47.54 | 276 | 5.52 | 1.32 | 30 | 80.42 | 80 | 150-300 | 2.900806 | 872.3 | 47.54 | 6 |
| 21 | 85 | 50-60 | 298.18 | 536.15 | 23.77 | 138 | 2.76 | 0.66 | 30 | 40.21 | 80 | 150-300 | 2.900806 | 436.15 | 23.77 | 6 |
| 22 | 85 | 250 | 298.18 | 536.15 | 23.77 | 138 | 2.76 | 0.66 | 0 | 40.21 | 80 | 150-300 | 2.900806 | | | |

| Example | Particle Size Distribution [grams] Size Class Median Size | | | | | | | | Differential Particle Size Distribution [%] Size Class Median Size | | |
|---|---|---|---|---|---|---|---|---|---|---|---|
| 19, 20 & 21 | | | 753 | 654 | 527 | 373 | 247 | 119 | | | 753 |
| 22 | 753 | 654 | 527 | 373 | 277 | 220 | 165 | 119 | 753 | 654 | 527 |
| 19 | | | 0.4 | 0.6 | 15.4 | 284.8 | 67 | 2.2 | | | 0.11 |
| 20 | | | 2.3 | 6.4 | 69.8 | 361.2 | 113.1 | 1.9 | | | 0.41 |
| 21 | | | 0.9 | 6.5 | 32.1 | 182.6 | 110.9 | 2.1 | | | 0.27 |
| 22 | 0 | 0 | 1.2 | 173.2 | 0 | 0 | 0 | 51 | 0.00 | 0.00 | 0.53 |

| Example | Differential Particle Size Distribution [%] Size Class Median Size | | | | | Yield [%] | $d_{10}$ [um] | $d_{90}$ [um] | Span [um] |
|---|---|---|---|---|---|---|---|---|---|
| 19, 20 & 21 | 654 | 527 | 373 | 247 | 119 | | | | |
| 22 | 373 | 277 | 220 | 165 | 119 | | | | |
| 19 | 0.16 | 4.16 | 76.89 | 18.09 | 0.59 | 101 | 168 | 331 | 163 |
| 20 | 1.15 | 12.58 | 65.12 | 20.39 | 0.34 | 112 | 115 | 466 | 351 |
| 21 | 1.94 | 9.58 | 54.49 | 33.09 | 0.63 | 90 | 134 | 362 | 228 |
| 22 | 76.84 | 0.00 | 0.00 | 0.00 | 22.63 | 55 | 53 | 309 | 256 | layer was decanted. Fresh water was added to wash the solids. This washing procedure was repeated a further two times. The slurry was finally filtered and dried in air. A number of sieves were used to separate the dried particles into a number of fractions. The results of the analysis are shown in Table 6.

Example 22 was conducted in batch mode. All of the ingredients shown in Table 6 were charged to the reactor and heated to 85° C. The contents were held at 85° C. for 5 hours before being heated to 90° C. for at least 40 minutes. The batch was then cooled to 40° C. The same washing, filtration and drying as is described for examples 19, 20 and 21 was used for example 22. The results of the sieve are shown in Tables 6.

Of the 4 experiments described above, the two single stage experiments conducted in semi-batch mode resulted in the highest $d_{10}$ value and the lowest span values of all four experiments. The experiment conducted in batch mode (example 22) had the lowest $d_{10}$ value and the second widest span (except for experiment 20). This indicates that for single stage experiments, semi-batch operation yielded narrower distributions with significantly fewer fines particles. The experiment Examples 23-29

Addition of Batch in Parts

Examples 23 and 24 represent separate stages of a two-stage experiment. The quantities listed for Example 23 were charged to the reactor in batch mode except that 436.15 grams of formaldehyde (37%, 7.5% methanol) and all of the ammonia (23.77 grams) were fed to the reactor at a rate of 6 mls/min. The feed was commenced once the reactor had reached 85° C. After a 5-hour reaction time, the batch was heated to 90° C. for 40 minutes. It was then cooled to 40° C. Half of the batch was drained from the vessel; the drained portion was allowed to settle and the liquid layer was removed from the vessel. The solids were reslurried with water three times to wash the solids. The slurry was then filtered and dried by passing room temperature air through the solids bed until it was dry. This powder was sieved and the results are shown in Table 7. In Example 24, the material remaining in the reactor from Example 23 was re-heated to 85° C. and the ingredients listed in Table 6 were added to the reactor. Again, 168.07 grams of the formaldehyde (37%) and all of the ammonia (11.8 grams) were charged in semi-batch mode to the vessel. All the other quantities were charged in batch mode. In example 24, no seeds were added to the vessel as the particles already present acted as seed material for the charge for example 24. After 5 hours at 85° C., the reaction was cooled to 40° C. The slurry was drained from the vessel and it was allowed to settle in a beaker; the liquid layer was removed from the beaker. The solids were reslurried with water three times in order to wash them. The slurry was then filtered and dried by passing room temperature air through the solids bed until it was dry. The yield of solids from the process was 89.82%.

Table 7 provides the particle size distributions from Examples 23 and 24. The advantages of operating in two stages as opposed to one stage can be seen from the particle size distribution. In example 24, the particle size distribution has grown such that there are more large particles present (>500 um) and fewer small particles present (<300 um) than in example 23. This mode of operation is advantageous for a process in which greater large particles and fewer fines particles are desired. The increase in the number of large sized particles comes at the expense of very little fines generation. This is reflected in the change in the value of the span. For experiment 23, it was 210 μm while for experiment 24, it was 242 μm.

The results from another single stage experiment (example 25) are also shown in Table 7. This experiment was conducted in semi-batch mode with all of the ingredients being added to the reactor except for 436.15 grams of formaldehyde (37%) and 23.77 grams of ammonia. These were added in semi-batch mode once the reactor reached 85° C. The experiment was continued for 5 hours when the slurry was heated to 90° C. for at least 40 minutes and then cooled to 40° C. The slurry was drained from the reactor and washed 4 times with water using a decantation/re-slurrying procedure. The solids were finally filtered, washed with water and dried using air at room temperature. The results for example 25 are shown in Table 7.

The results show that by doing an experiment in parts, a greater amount of large sized particles can be generated as evidenced by the greater $d_{90}$ value in example 24 (418.10 μm) compared with examples 23 (334.70 μm) and 25 (331.50 μm). The yield of particles greater than 425 μm in example 24 is 25.69% while for examples 23 and 25 it is 7.93% and 4.43% respectively.

In Examples 26-29, the second group of experiments, four experiments are compared for their ability to grow the smallest particle size generated from the reaction (0-150 μm). All of the experiments were done in semi-batch mode. The first three experiments (example 26, 27, 28) were done in one stage, while the final experiment (example 29) was done in four stages. A much smaller quantity of seeds was used in the final experiment, as the seeds were ratio'ed to the amount of phenol charged to the reactor as part of the first stage charges to the vessel. However, on a seed surface area per quantity of phenol charged to the vessel, it is comparable to the amount of seed surface area in examples 27 and 28. Example 26 used twice the amount of seeds that was used in the other three experiments.

In Examples 26, 27 and 28, 138 grams of water, 0.66 grams of SDS and 2.76 grams of CMC were added to the reactor along with 298.18 grams of phenol (88%) and 100 grams of formaldehyde (37%, 7.5% methanol). 436.15 grams of formaldehyde and 23.77 grams of ammonia were added in semi-batch mode. In Example 29, a total of 857.84 grams of formaldehyde, 477.08 grams of phenol, 220.8 grams of water, 38 grams of ammonia, 4.416 grams of Na—CMC, 1.04 grams of SDS were added to the reactor. 30 grams of ethanol was added to each experiment except for the experiment in example 29. Each of these quantities was split into 4 equal portions. During each stage of operation, one portion of each reactant was added to the reactor. For the formaldehyde portion (214.46 grams), 40 grams were added to the reactor and 174.46 grams were added in semi-batch mode at a rate of 6 mls/min. All of the ammonia for each stage (9.5 grams) was added along with the formaldehyde.

In example 29, the first stage was conducted in a similar fashion to examples 26, 27 and 28. The formaldehyde and ammonia mixture was added once the reaction temperature reached 85° C. The reaction was continued for 3 hours before the next stage was started. The phenol, formaldehyde, Na—CMC, SDS, water and part of the formaldehyde was added to the reactor in one charge and the remaining formaldehyde and ammonia were added in semi-batch mode at a rate of 6 mls/min. After a further 3 hours the third stage was conducted in the same way as the second and after a further 3 hours, the fourth stage was completed in the same way. After the fourth stage was completed (3 hours), the vessel was heated to 90° C. for at least 40 minutes and subsequently cooled to 40° C. The formed slurry was filtered, washed with water and dried with air for 12 hours. The formed particle size distribution was sieved and the results are shown in Table 8.

Comparing all of the examples shows that conducting an experiment in four stages was superior to conducting it in a single stage when the quantity of seeds added initially is equivalent in terms of the weight added per unit of phenol or any other reactant added. When compared in terms of the amount of large particles produced, example 29 yielded much larger particles than either example 26, 27 or 28. The d10 value for all experiments was comparable while the d90 value for the staged experiment was much greater. The results also show that the yields achieved are comparable by both methods of operation.

TABLE 7

Experimental description and results from experiments with addition of reactants by parts.

a

| | Operating conditions | | Quantities added to reactor | | | | | | | | | Seed size range [um] | Surface Area [m2/kg phenol] | Quantities added in semi-batch | | |
|---|---|---|---|---|---|---|---|---|---|---|---|---|---|---|---|---|
| Ex. | Temp. [°C.] | Impeller speed [RPM] | Phenol [gr] | Formaldehyde [gr] | Ammonia [gr] | Water [gr] | Na-CMC [gr] | SDS [gr] | Ethanol [gr] | Methanol [gr] | Seeds [gr] | | | Formaldehyde [gr] | Ammonia [gr] | Rate [mls/min] |
| 23 | 85 | 55 | 298.18 | 536.15 | 23.77 | 138 | 2.76 | 0.66 | 30 | 40.21 | 80 | 150-300 | 2.90 | 436.15 | 23.77 | 6 |
| 24 | 85 | 55 | 149.09 | 268.07 | 11.88 | 69 | 1.38 | 0.33 | 15 | 20.11 | 0 | 150-300 | | 168.07 | 11.88 | 6 |
| 25 | 85 | 55 | 298.18 | 536.15 | 23.77 | 138 | 2.76 | 0.66 | 30 | 40.21 | 80 | 150-300 | 2.90 | 436.15 | 23.77 | 6 | b

| | Particle Size Distribution [grams] Size Class Median Size | | | | | | Differential Particle Size Distribution [%] Size Class Median Size | | |
|---|---|---|---|---|---|---|---|---|---|
| Example | 753 | 654 | 527 | 373 | 247 | 119 | 753 | 654 | 527 |
| 23 | 0.3 | 4 | 10.3 | 93.1 | 73.8 | 2.5 | 0.16 | 2.17 | 5.60 |
| 24 | 1.1 | 1 | 86.8 | 198.6 | 56.2 | 2.3 | 0.32 | 0.29 | 25.09 |
| 25 | 0.4 | 0.6 | 15.4 | 284.8 | 67 | 2.2 | 0.11 | 0.16 | 4.16 |

| | Differential Particle Size Distribution [%] Size Class Median Size | | | Yield | $d_{10}$ | $d_{90}$ | Span |
|---|---|---|---|---|---|---|---|
| Example | 373 | 247 | 119 | [%] | [um] | [um] | [um] |
| 23 | 50.60 | 40.11 | 1.36 | | 124.327 | 334.67 | 210 |
| 24 | 57.40 | 16.24 | 0.66 | 89.82 | 176.434 | 418.07 | 242 |
| 25 | 76.89 | 18.09 | 0.59 | 100.77 | 168.496 | 331.49 | 163 |

TABLE 8 a
Operating conditions for examples 26, 27, 28 and 29.

| | Operating conditions | | Quantities added to reactor | | | | | | | | | Seed size range [um] | Surface Area [m2/kg phenol] | Quantities added in semi-batch | | |
|---|---|---|---|---|---|---|---|---|---|---|---|---|---|---|---|---|
| Ex | Temp [°C.] | Impeller speed [RPM] | Phenol [gr] | Formaldehyde [gr] | Ammonia [gr] | Water [gr] | Na-CMC [gr] | SDS [gr] | Ethanol [gr] | Methanol [gr] | Seeds [gr] | | | Formaldehyde [gr] | Ammonia [gr] | Rate [mls/min] |
| 26 | 85 | 50 | 298.18 | 536.15 | 23.77 | 138 | 2.76 | 0.66 | 30 | 40.21125 | 120 | 0-150 | 18.05 | 436.15 | 23.77 | 6 |
| 27 | 85 | 50 | 298.18 | 536.15 | 23.77 | 138 | 2.76 | 0.66 | 30 | 40.21125 | 60 | 0-150 | 9.02 | 436.15 | 23.77 | 6 |
| 28 | 85 | 250 | 298.18 | 536.15 | 23.77 | 138 | 2.76 | 0.66 | 30 | 40.21125 | 60 | 0-150 | 9.02 | 436.15 | 23.77 | 6 |
| 29 | 85 | 50 | 477.08 | 857.84 | 38 | 220.8 | 4.416 | 1.04 | 0 | 64.338 | 20 | 0-150 | 9.39 | 697.84 | 38 | 6 | b
Results for examples 26, 27, 28 and 29.

| | Particle Size Distribution [grams] Size Class Median Size | | | | | | | | Differential Particle Size Distribution [%] Size Class Median Size | | |
|---|---|---|---|---|---|---|---|---|---|---|---|
| Example | | | | | | | | | | | |
| 26 & 27 | | | | 753 | 654 | 527 | 373 | 247 | 119 | | 753 |
| 28 & 29 | 753 | 654 | 527 | 373 | 277 | 220 | 165 | 119 | 753 | 654 | 527 |
| 26 | | | | 0.3 | 0.2 | 0.3 | 1 | 322.9 | 71.8 | | 0.08 |
| 27 | | | | 0 | 0 | 0.1 | 7.3 | 313.2 | 21.5 | | 0.00 |

TABLE 8-continued

| | | | | | | | | | | | |
|---|---|---|---|---|---|---|---|---|---|---|---|
| 28 | 0.4 | 0.2 | 1.1 | 0.6 | 36.7 | 174.8 | 80.9 | 58.7 | 0.11 | 0.06 | 0.31 |
| 29 | 1.5 | 0.8 | 1.9 | 294.7 | 42.1 | 25.7 | 6.9 | 85.8 | 0.33 | 0.17 | 0.41 |

| | Differential Particle Size Distribution [%] Size Class Median Size | | | | | Yield [%] | $d_{10}$ [um] | $d_{90}$ [um] | Span [um] |
|---|---|---|---|---|---|---|---|---|---|
| Example | | | | | | | | | |
| 26 & 27 | 654 | 527 | 373 | 247 | 119 | | | | |
| 28 & 29 | 373 | 277 | 220 | 165 | 119 | | | | |
| 26 | 0.05 | 0.08 | 0.25 | 81.44 | 18.11 | 94.23 | 51 | 221 | 170 |
| 27 | 0.00 | 0.03 | 2.13 | 91.55 | 6.28 | 95.57 | 99 | 226 | 127 |
| 28 | 0.17 | 10.38 | 49.46 | 22.89 | 16.61 | 103.45 | 56 | 210 | 154 |
| 29 | 64.15 | 9.16 | 5.59 | 1.50 | 18.68 | 94.11 | 102 | 419 | 317 |

Examples 30-31

Table 9 shows the operating conditions and results of two experiments, Examples 30 and 31. The first is a standard semi-batch experiment using the ingredients as given in Table 9. Similar to previous examples, 436.15 grams of the formaldehyde (7.5%) and all of the ammonia (23.77 grams) was added in semi-batch mode at a rate of 6 ml/min, starting when the target operating temperature was reached (85° C.). In Example 31, the same procedure was used as in example 30 except that an additional quantity of ammonia (23.77 grams) was pumped into the reactor 30 minutes after the formaldehyde and ammonia had been added to the reactor. The ammonia was added at a rate of 6 mls/min.

To each experiment, 138 grams of water, 0.66 grams of SDS and 2.76 grams of CMC were also added in batch mode at the start of the experiment. In both cases 80 grams of seeds in the 150 to 300 um size range were used. The use of the additional ammonia resulted in a greater quantity of large beads compared to the case where no supplementary ammonia was added. Although the overall yield of product from example 31 was lower than example 30 (87.47% vs. 100.77%), the yield of particles above a size of 425 um was much greater (78.45% vs. 4.43%). This increase in the amount of larger sized particles comes at only a minor increase in the span from a value of 163 μm to 188 μm. This reflects the ability of supplemental ammonia to grow particles of all sizes.

TABLE 9

Experimental description and results from experiments with supplementary addition of ammonia.

Table 9a

| | Operating conditions | | Quantities added to reactor | | | | | | | | | | | Quantities added in semi-batch | | |
|---|---|---|---|---|---|---|---|---|---|---|---|---|---|---|---|---|
| Ex | Temp. [° C.] | Impeller speed [RPM] | Phenol [gr] | Formaldehyde [gr] | Ammonia [gr] | Water [gr] | Na-CMC [gr] | SDS [gr] | Ethanol [gr] | Methanol [gr] | Seeds [gr] | Seed size range [um] | Surface Area [m2/kg phenol] | Formaldehyde [gr] | Ammonia [gr] | Rate [mls/min] |
| 30 | 85 | 250 | 298.18 | 536.15 | 23.77 | 138 | 2.76 | 0.66 | 30 | 40.21 | 80 | 150-300 | 2.90 | 436.15 | 23.77 | 6 |
| 31 | 85 | 305 | 298.18 | 536.15 | 47.54 | 138 | 2.76 | 0.66 | 30 | 40.21 | 80 | 150-300 | 2.90 | 436.15 | 23.77 | 6 |

Table 9b

| | Particle Size Distribution [grams] Size Class Median Size | | | | | | Differential Particle Size Distribution [%] Size Class Median Size | | | | | | Yield [%] | Yield <425 um [%] | $d_{10}$ [um] | $d_{90}$ [um] | Span [um] |
|---|---|---|---|---|---|---|---|---|---|---|---|---|---|---|---|---|---|
| Example | 753 | 654 | 527 | 373 | 247 | 119 | 753 | 654 | 527 | 373 | 247 | 119 | | | | | |
| 30 | 0.4 | 0.6 | 15.4 | 284.8 | 67 | 2.2 | 0.11 | 0.16 | 4.16 | 76.89 | 18.09 | 0.59 | 100.77 | 4.43 | 168 | 331 | 163 |
| 31 | 20.2 | 14.3 | 224.7 | 63.6 | 3.9 | 3.7 | 6.11 | 4.33 | 68.01 | 19.25 | 1.18 | 1.12 | 87.47 | 78.45 | 278 | 466 | 188 |

Examples 32-35

In Table 10, the details of Examples 32-35 are given, from which it can be seen that the charge of materials to each batch was equivalent except for the quantity of methanol present. In example 32, the formalin added contained 1% methanol that was equivalent to 5.26 grams of methanol. The formalin in example 33 contained 7.5% methanol equivalent to 40.21 grams of methanol. The 7.5% solution was used in examples 34 and 35 also but additional methanol was added such that the experiments in examples 34 and 35 contained 70.21 grams and 100.21 grams of methanol respectively.

All of the quantities in Table 10, including 80 grams of seed material, were charged to the batch reactor except for 436.15 grams of formaldehyde and 23.77 grams of ammonia. These materials were added later to the vessel in semi-batch mode.

Each charge was heated to 85° C. and held for 5 hours. Once the reaction mixture had reached 85° C., the remaining formaldehyde solution and ammonia were added to the reactor in semi-batch mode over a period of 45 minutes.

After 5 hours of reaction, the slurry formed was heated to 90° C. for 45 minutes, after which it was cooled to 30° C. The slurry was subsequently subjected to three solvent exchange steps with water before the slurry was filtered. The recovered solids were dried at room temperature for 12 hours and sieved using a series of perforated sieve plates. The mass retained on each sieve plate is shown in Table 10. Also shown in Table 10 is the yield of product and the yield of product in the size ranges above 425 um. The span is also shown in table 10. It shows a maximum value when the methanol content is 40 grams (320 μm) and with 5.36 grams, it has a value of 157 μm.

The results in Table 10 show that while the overall total yield of product does not correlate directly with the quantity of methanol in the reactor, the change in the yield of total product above 425 um increases with a decrease in the amount of methanol in the batch.

beads of 425-500 microns were analyzed by DSC and showed an onset Tg at 47° C. 600 g of these beads were refluxed in 3000 g of water (~97° C.) with stirring at ambient pressure for 30 minutes and were subsequently washed with 3000 ml of water. A portion of these beads were air dried at ambient temperature while the remainder was left wet. DSC of the dried beads showed that the onset Tg had shifted to 94° C. Wet and dried samples were subsequently carbonized in a laboratory rotary furnace in nitrogen using a 2 hour ramp to 1000° C. In both cases, the beads did not stick or clump throughout the carbonization. The carbonized products from the wet and dried starting materials were subsequently activated for 2

TABLE 10 a
Charge quantities for each experiment

| | Operating conditions | | Quantities added to reactor | | | | | | | | | | | Quantities added in semi-batch | | |
|---|---|---|---|---|---|---|---|---|---|---|---|---|---|---|---|---|
| Ex. | Temp. [° C.] | Impeller speed [RPM] | Phenol [gr] | Formaldehyde [gr] | Ammonia [gr] | Water [gr] | Na-CMC [gr] | SDS [gr] | Ethanol [gr] | Methanol [gr] | Seeds [gr] | Seed size range [um] | Surface Area [m2/kg phenol] | Formaldehyde [gr] | Ammonia [gr] | Rate [mls/min] |
| 32 | 85 | 250 | 298.18 | 536.15 | 23.77 | 138 | 2.76 | 0.66 | 0 | 5.36 | 80 | 150-300 | 2.90 | 436.15 | 23.77 | 6 |
| 33 | 85 | 260 | 298.18 | 536.15 | 23.77 | 138 | 2.76 | 0.66 | 0 | 40.21 | 80 | 150-300 | 2.90 | 436.15 | 23.77 | 6 |
| 34 | 85 | 250 | 298.18 | 536.15 | 23.77 | 138 | 2.76 | 0.66 | 0 | 70.21 | 80 | 150-301 | 2.90 | 436.15 | 23.77 | 6 |
| 35 | 85 | 250 | 298.18 | 536.15 | 23.77 | 138 | 2.76 | 0.66 | 0 | 100.21 | 80 | 150-302 | 2.90 | 436.15 | 23.77 | 6 | b
Results in terms of the particle size distribution, yield and span

| | Particle Size Distribution [grams] Size Class Median Size | | | | | | Differential Particle Size Distribution [%] Size Class Median Size | | |
|---|---|---|---|---|---|---|---|---|---|
| Example | 753 | 654 | 527 | 373 | 247 | 119 | 753 | 654 | 527 |
| 32 | 0 | 0 | 246.7 | 79.8 | 0 | 0 | 0.00 | 0.00 | 75.56 |
| 33 | 0.2 | 0.2 | 127.1 | 121.3 | 82.6 | 25.6 | 0.06 | 0.06 | 35.60 |
| 34 | 2.1 | 4 | 21.7 | 218.3 | 76.3 | 2.3 | 0.65 | 1.23 | 6.68 |
| 35 | 1.4 | 4.6 | 22.9 | 234 | 19.8 | 15.3 | 0.47 | 1.54 | 7.68 |

| | Differential Particle Size Distribution [%] Size Class Median Size | | | Yield [%] | Yield <425 um [%] | $d_{10}$ [um] | $d_{90}$ [um] | Span [um] |
|---|---|---|---|---|---|---|---|---|
| Example | 373 | 247 | 119 | | | | | |
| 32 | 24.44 | 0.00 | 0.00 | 87.30 | 75.56 | 84 | 241 | 157 |
| 33 | 33.98 | 23.14 | 7.17 | 96.87 | 35.71 | 111 | 430 | 320 |
| 34 | 67.23 | 23.50 | 0.71 | 87.73 | 8.56 | 150.43 | 336.63 | 186 |
| 35 | 78.52 | 6.64 | 5.13 | 77.79 | 9.70 | 199.29 | 338.39 | 139 |

Examples 36-45

The following examples illustrate various thermal treatments of phenol-formaldehyde resol resin beads prepared in an aqueous environment using an ammonia catalyst, in a manner as already described. The beads precipitated from the aqueous reaction mixture at the end of the reaction, were washed with water, and then dried at ambient temperature.

Example 36

This example illustrates the hydrothermal treatment of resol resin beads and subsequent carbonization. Starting hours in 50 volume % steam in nitrogen at 900° C. in a fluidized bed reactor resulting in BET surface areas of 814 and 852 m²/g, respectively.

Example 37

This example illustrates a scaled-up version of the hydrothermal process and subsequent carbonization. 37.6 pounds (17.1 kg) of 400-500 micron resin beads were slurried in 25 L of water in a 50 L flask. The beads were heated to reflux and held for one hour. They were then cooled, filtered and washed with an equal weight (~38 pounds, 17.2 kg) of water. The beads were left water wet with no further drying. About a pound of these beads were carbonized in nitrogen to 1000° C. in a laboratory rotary reactor and activated in the same reactor at ~878° C. for 3 hours in 50 volume % steam (3 standard L/min total gas feed rate). There was no indication of sticking or clumping in the carbonization or subsequent activation. The resulting activated material had a BET surface area of 443 m²/g.

Example 38

This example illustrates that insufficient agitation results in clumping when the resin is treated with steam.

A 2-inch ID stainless steel reactor containing a gas inlet line leading to the base of a frit at the bottom of the reactor was heated in nitrogen (1.0 SLPM) to 120° C. The gas inlet line was also heated to 120°. The nitrogen flow was then discontinued, and liquid water was fed at 4.333 mL/minute and vaporized in the 120° C. gas inlet line. The steam flow was continued for 5 minutes to purge the nitrogen from the lower region of the reactor. The uncured resin beads (74.2 g) were loaded into a glass tube containing a coarse frit. The top of the tube was fitted with a septum that allowed a ¼ inch stainless steel tube to move up and down in the cylinder. The stainless steel tube was connected to ¼ inch bellows tubing. The other end of the bellows tubing was attached to another ¼ inch stainless steel tube that fit through the existing thermocouple fitting on the top of the 2-inch ID stainless steel reactor and extended about one inch below the region where the reactor head attached to the reactor. The base of the glass tube was attached to a nitrogen supply. The nitrogen supply was used to inert the material in the tube and then to fluidize it in the glass tube at the desired time. Lowering the stainless tube into the fluidized uncured beads allowed the beads to be transferred from the tube into the heated 2-inch ID reactor because of the significantly increased linear velocity in the small tube. The configuration of the reactor was such that the steam and the nitrogen carrier exited the reactor at a point above where the solids entered the reactor thus minimizing the mixing of the nitrogen with steam in the base of the reactor. The resin beads were added to the steam stream in the 2-inch ID reactor in 7 minutes. The steam treatment was continued at 120° C. for an additional 48 minutes. The steam flow was terminated and the reactor was held for an additional hour in a slow nitrogen flow (42 SCCM) during which time water continued to evolve from the reactor. The reactor was then allowed to cool in nitrogen (1.0 SLPM). The material isolated from the reactor (62.8 g) was very loosely clumped together and easily broken up, but it was not free flowing. The velocity of the steam during this example was below the fluidization velocity of the resin beads.

Example 39

This example illustrates the use of a vacuum rotary cone dryer [model, source] and the subsequent carbonization of the product. 120 pounds (54.4 kg) of beads were dried at 50° C. for 8 hours in a rotary cone dryer operating under vacuum, approximately 70 mm Hg. The resulting dry product was sieved, and the 400-500 micron cut was transferred back to the same dryer and heated to 100° C. and held there for 2 hours, all under vacuum (about 70 mm Hg). 335 g of these beads were carbonized in 6 L/min nitrogen to 900° C. in a laboratory rotary reactor and activated in 90% steam in the same reactor at ~878° C. for 2 hours in 90 volume % steam (6 standard L/min total gas feed rate). No sign of sticking or clumping was observed in the carbonization or subsequent activation.

Example 40

This example illustrates that sticking occurs in the absence of an elevated final temperature, with the use of a rotary cone dryer. 120 pounds (54.4 kg) of beads were dried at 50° C. for 8 hours in a rotary cone dryer operating under full vacuum. The resulting dry product was sieved and a portion of the 400-500 micron cut was used as is without further treatment. 346 g of these beads were carbonized in 6 L/min nitrogen to 1000° C. in a laboratory rotary reactor and activated in 90% steam in the same reactor at ~878° C. for 2 hours in 90 volume % steam (6 standard L/min total gas feed rate). During the carbonization, the beads were observed to stick to each other and adhere to the inner wall of the reactor between furnace temperatures of ~150 to ~450° C.

Example 41

This example illustrates a process of the invention and subsequent curing using a fluidized bed. A 2-inch ID stainless steel fluidized bed reactor fitted with a thermocouple and gas dispersion frit was loaded with 420-590 micron resin beads (303.1 g). The resin beads were fluidized in nitrogen (29 SLPM). The temperature was increased from ambient to 105° C. over 80 minutes, held at 105° C. for 60 minutes, increased to 150° C. over 90 minutes and held at 150° C. for 60 minutes. Upon cooling the material recovered from the reactor (266.5 g) was free flowing.

Example 42

This example illustrates that clumping may occur, even with agitation, if proper temperatures are not maintained for a sufficient time.

A 2-inch ID stainless steel fluidized bed reactor fitted with a thermocouple and gas dispersion frit was loaded with 420-590 micron resin beads (301.2 g). The resin beads were fluidized in nitrogen (29.8 SLPM). The temperature was increased from ambient to 150° C. over 60 minutes, held at 150° C. for 60 minutes, increased to 250° C. over 60 minutes and held at 250° C. for 60 minutes. Upon cooling, the material recovered from the reactor (247.0 g) was fused into a cylinder sticking to the thermocouple, reactor walls, and gas dispersion frit.

Example 43

This example illustrates that the process of the invention can be integrated with the carbonization reaction in a single reactor.

A 2-inch ID stainless steel fluidized bed reactor fitted with a thermocouple and gas dispersion frit was loaded with 420-590 micron resin beads (301.8 g). The resin beads were fluidized in nitrogen (29 SLPM). The temperature was increased from ambient to 105° C. over 80 minutes, held at 105° C. for 60 minutes, and then allowed to cool and kept fluidized over the weekend in nitrogen (29 SLPM). The material was then heated in nitrogen (29 SLPM) to 1000° C. over 300 minutes and held at 1000° C. for 15 minutes. Upon cooling the carbonized material recovered from the reactor (168.8 g) was free flowing.

Example 44

This example illustrates the formation of activated carbon beads by the process of the invention featuring a carbonization in nitrogen and activation in 50% steam-50% nitrogen in a fluidized bed.

350.1 g water wet resin beads from Example 37 were charged into a 2-inch ID stainless steel reactor containing a gas inlet line leading to the base of a frit at the bottom of the reactor and a 5-element thermocouple mounted in the resin bed. Nitrogen was fed to the reactor at 29 SLPM, and the reactor was heated in a three-element electrical vertically-mounted tube furnace from ambient temperature to 105° C. over a 20 minute period and held at 105° C. for 60 minutes. The nitrogen flow rate was then reduced to 10.8 SLPM and the temperature increased to 900° C. over a 120 minute period. Upon reaching a bed temperature of 900° C. the nitrogen flow was reduced to 5.4 SLPM, and water was fed to the reactor at a rate of 4.333 mL liquid/minute through an inlet line heated to 120° C. to vaporize the water before it entered the reactor. The steam-nitrogen feed was continued at a 900° C. furnace temperature for 120 minutes. During the activation a 4-5° C. endotherm was measured by the 5-element thermocouple. At the completion of the 120 minute activation, the water feed was terminated, the nitrogen flow was set for 10.8 SLPM, and the reactor was allowed to cool.

116.8 g activated carbon beads were isolated from the reactor. The activated product had an apparent density=0.66 g/cc, a mean particle size of about 380 microns, a BET surface area=1032 m$^2$/g, pore volume=0.468 cc/g, and 98% of the pores were less than 20 angstroms in diameter.

Example 45

This example illustrates the formation of activated carbon beads by the process of the invention featuring a carbonization and activation both performed in 50% steam-50% nitrogen in a fluidized bed.

196.4 g water wet resin beads from Example 37 were charged into a 2-inch ID stainless steel reactor containing a gas inlet line leading to the base of a frit at the bottom of the reactor and a 5-element thermocouple mounted in the resin bed. Nitrogen was fed to the reactor at 29 SLPM, and the reactor was heated in a three-element electrical vertically-mounted tube furnace from ambient temperature to 105° C. over a 20 minute period and held at 105° C. for 60 minutes. The nitrogen flow was reduced to 5.4 SLPM, and water was fed to the reactor at a rate of 4.333 mL liquid/minute through an inlet line heated to 120° C. to vaporize the water before it entered the reactor. The reactor was then heated to 900° C. over a period of 120 minutes. The steam-nitrogen feed was continued at a 900° C. furnace temperature for 120 minutes. During the activation a 4-8° C. endotherm was measured by the 5-element thermocouple. At the completion of the 120 minute activation, the water feed was terminated, the nitrogen flow was set for 10.8 SLPM, and the reactor was allowed to cool.

50.3 g activated carbon beads were isolated from the reactor. The activated product had an apparent density=0.60 g/cc, a mean particle size of 381 microns, a BET surface area=1231 m$^2$/g, pore volume=0.576 cc/g, and 97% of the pores were less than 20 angstroms in diameter.

We claim:
1. A process for producing resol beads having a desired particle size and particle size distribution, the process comprising:
   a) reacting a phenol with an aldehyde, in the presence of a base as catalyst, in an agitated aqueous medium provided with a colloidal stabilizer, and optionally a surfactant, for a period of time and at a temperature sufficient to produce an aqueous dispersion of resol beads;
   b) recovering resol beads below a minimum particle size;
   c) recycling the previously formed resol beads below the minimum particle size into a further aqueous medium of step a) to give a further aqueous dispersion of resol beads;
   d) optionally separating any beads below the minimum particle size to obtain resol beads above a minimum particle size and further previously formed resol beads below the minimum particle size; and
   e) optionally recycling any further previously formed resol beads below said minimum size to step c);
   wherein the previously formed resol beads are not further cured prior to recycling.

2. The process according to claim 1, wherein the previously-formed resol beads that are recycled according to step c) have a median particle size from about 10 μm to about 1,500 μm.

3. The process according to claim 1, wherein the previously-formed resol beads that are recycled according to step c) have a median sphericity value from about 0.90 to 1.0.

4. The process according to claim 1, wherein the previously-formed resol beads that are recycled according to step c) have a median particle size from 75 μm to 750 μm.

5. The process according to claim 1, wherein the previously-formed resol beads that are recycled according to step c) have a median particle size from about 125 μm to about 300 μm.

6. The process according to claim 1, wherein the previously-formed resol beads that are recycled according to step c) have a particle size distribution span from about 10 to about 500.

7. The process according to claim 1, wherein the previously-formed resol beads that are recycled according to step c) have a particle size distribution span from about 25 to about 250.

8. The process according to claim 1, wherein the previously-formed resol beads that are recycled according to step c) have a particle size distribution span from about 25 to about 150.

9. The process according to claim 1, wherein the resol beads above the minimum particle size have a median particle size from about 10 μm to about 2,000 μm.

10. The process according to claim 1, wherein the resol beads above the minimum particle size have a median sphericity value from about 0.90 to 1.0.

11. The process according to claim 1, wherein the resol beads above the minimum particle size have a median particle size from about 100 μm to about 750 μm.

12. The process according to claim 1, wherein the phenol comprises monohydroxybenzene.

13. The process according to claim 1, wherein the aldehyde comprises formaldehyde.

14. The process according to claim 1, wherein the base comprises one or more of ammonia or ammonium hydroxide.

15. The process according to claim 1, wherein the previously-formed resol beads that are recycled according to step c) are provided in an amount of at least 10 wt. %, based on the weight of the phenol.

16. The process according to claim 1, wherein the molar ratio of the aldehyde to the phenol is from about 1.1:1 to about 3:1.

17. The process according to claim 1, wherein the colloidal stabilizer comprises a carboxymethyl cellulose salt.

18. The process according to claim 17, wherein the carboxymethyl cellulose salt has a degree of substitution from about 0.6 to about 1.1 and a weight average molecular weight from about 100,000 to about 400,000.

19. The process according to claim 1, wherein the total external surface area of the previously-formed resol beads provided to step c) is at least 4 m² per each kilogram of phenol.

20. The process according to claim 1, wherein the temperature is from about 70° C. to about 98° C.

21. The process according to claim 1, wherein the temperature is from 75° C. to 90° C.

22. The process according to claim 1, wherein the surfactant is present and comprises an anionic surfactant.

23. The process according to claim 1, wherein the surfactant is present and comprises one or more of: sodium dodecyl sulfate or sodium dodecyl benzene sulfonate.

24. The process according to claim 1, wherein the base comprises one or more of: ammonia or hexamethylenetetramine.

25. The process according to claim 1, wherein the process further comprises adding, after the reacting of step a) has begun, a further portion of a base.

26. The process according to claim 1, wherein the process further comprises adding, after the resol beads of step a) are formed, an acid.

27. The process according to claim 1, wherein methanol is present in the aldehyde provided to the reaction mixture of step a) in an amount of no more than about 2 wt. %, based on the total weight of the aldehyde.

28. The process according to claim 1, wherein the agitated aqueous medium is agitated by one or more of: a pitched blade impeller; a high efficiency impeller; a turbine; an anchor; a spiral agitator; a rotating agitator; a flow induced by circulation; or flowing the aqueous medium past a stationary mixing device.

29. The process according to claim 1, wherein the previously-formed resol beads that are recycled according to step c) have a median particle size from 125 μm to 250 μm and a particle size distribution span from about 25 to about 150, and the resol beads obtained in step c) have a median particle size from 250 μm to 500 μm.

30. The process according to claim 1, wherein the resol beads obtained in step c) comprise from about 0.5% nitrogen to about 3% nitrogen, based on elemental analysis.

31. The process according to claim 1, wherein the resol beads obtained in step c) comprise from 0.8% nitrogen to 2.6%, based on elemental analysis.

32. The process according to claim 1, wherein the previously formed resol beads that are recycled according to step c) are soluble in methanol in an amount up to 20 wt. %.

33. The process according to claim 1, wherein the previously formed resol beads that are recycled according to step c) have a Tg from about 30° C. to about 120° C., as measured by DSC.

34. The process according to claim 1, wherein the previously formed resol beads that are recycled according to step c) have a Tg from 30° C. to 68° C., as measured by DSC.

35. The process according to claim 1, wherein the resol beads obtained in step c) have an acetone solubility of no more than about 5%.

36. The process according to claim 1, wherein the resol beads obtained in step c) have an acetone solubility of no more than 15%.

37. The process according to claim 1, wherein the resol beads obtained in step c) have an acetone solubility of no more than 26%.

38. The process according to claim 1, wherein the resol beads obtained in step c) have an acetone solubility of no more than 30%.

39. The process according to claim 1, wherein the resol beads obtained in step c) have a density from about 0.3 g/mL to about 1.3 g/mL.

40. The process according to claim 1, wherein the resol beads obtained in step c) have a density from 0.5 to 1.3 g/mL.

* * * * *